(12) United States Patent
Buchsbaum et al.

(10) Patent No.: US 11,590,459 B2
(45) Date of Patent: Feb. 28, 2023

(54) NANOPOROUS MEMBRANES FOR FAST DIFFUSION OF IONS AND SMALL MOLECULES

(71) Applicant: Lawrence Livermore National Security, LLC, Livermore, CA (US)

(72) Inventors: Steven F. Buchsbaum, Livermore, CA (US); Francesco Fornasiero, Oakland, CA (US); Melinda L. Jue, Livermore, CA (US); Eric R. Meshot, Oakland, CA (US); Sei Jin Park, Dublin, CA (US); Ngoc T. N. Bui, Richmond, CA (US); Chiatai Chen, Ithaca, NY (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 143 days.

(21) Appl. No.: 16/921,443

(22) Filed: Jul. 6, 2020

(65) Prior Publication Data
US 2020/0338505 A1  Oct. 29, 2020

Related U.S. Application Data

(63) Continuation-in-part of application No. 15/441,153, filed on Feb. 23, 2017, now Pat. No. 10,737,128.

(51) Int. Cl.
*B01D 71/02* (2006.01)
*B01D 61/24* (2006.01)
(Continued)

(52) U.S. Cl.
CPC ......... *B01D 71/021* (2013.01); *B01D 61/243* (2013.01); *B01D 67/0039* (2013.01);
(Continued)

(58) Field of Classification Search
CPC ......... A61M 1/34; A61M 1/341; B82Y 30/00; B01D 61/027; B01D 61/0079;
(Continued)

(56) References Cited

U.S. PATENT DOCUMENTS

2011/0253630 A1  10/2011  Bakajin et al.
2015/0238906 A1   8/2015  Krauss et al.

FOREIGN PATENT DOCUMENTS

CN   101296743 A   10/2008
CN   107433141 A   12/2017

OTHER PUBLICATIONS

Bui et al., "Ultrabreathable and Protective Membranes with Sub-5 nm Carbon Nanotube Pores," Advanced Materials, vol. 28, 2016, pp. 5871-5877.
(Continued)

*Primary Examiner* — Camie S Thompson
(74) *Attorney, Agent, or Firm* — Zilka-Kotab, P.C.

(57) ABSTRACT

A product includes a nanoporous membrane having a plurality of carbon nanotubes and a fill material in interstitial spaces between the carbon nanotubes for limiting or preventing fluidic transfer between opposite sides of the nanoporous membrane except through interiors of the carbon nanotubes. The longitudinal axes of the carbon nanotubes are substantially parallel, an average inner diameter of the carbon nanotubes is about 20 nanometers or less, and both ends of at least some of the carbon nanotubes are open. Moreover, the fill material is impermeable or having an average porosity that is less than the average inner diameter of the carbon nanotubes.

20 Claims, 17 Drawing Sheets

(51) Int. Cl.
 B01D 69/02 (2006.01)
 B01D 67/00 (2006.01)
(52) U.S. Cl.
 CPC ........ B01D 69/02 (2013.01); *B01D 2311/246* (2013.01); *B01D 2325/02* (2013.01); *B01D 2325/20* (2013.01)
(58) Field of Classification Search
 CPC ............ B01D 2325/18; B01D 2325/20; B01D 2325/02; B01D 53/228; B01D 51/243; B01D 2311/246; B01D 53/227; B01D 53/34; B01D 53/74; B01D 52/228; B01D 71/02; B01D 71/28; B01D 71/027; B01D 71/024; B01D 69/00; B01D 69/04; B01D 69/043; B01D 69/046; B01D 69/02; B01D 69/147; B01D 163/00; B01D 163/06; B01D 2319/04; C02F 1/442; C02F 1/44; C23C 16/26; C23C 16/45525; C23C 16/04; C23C 16/56; C23C 16/44; C23C 16/045
 USPC ............. 210/497.01, 650, 497.1, 645, 321.8, 210/502.1; 977/902, 742, 750, 842, 962; 442/121, 122, 76; 428/293.7, 304.4; 423/445 R; 264/41
 See application file for complete search history.

(56) References Cited

OTHER PUBLICATIONS

International Search Report and Written Opinion from PCT Application No. PCT/US2021/040575, dated Oct. 26, 2021.
Wikipedia, "Membrane technology," Wikipedia, Jun. 2020, 9 pages, retrieved from https://en.wikipedia.org/wiki/Membrane_technology.
Marcus, Y., "Ions in Solution and their Solvation," John Wiley & Sons, 2015, 311 pages.
Wu et al., "Electrophoretically induced aqueous flow through single-walled carbon nanotube membranes," Nature Nanotechnology, Jan. 2012, pp. 1-7.
Berrod et al., "Enhanced ionic liquid mobility induced by confinement in 1D CNT membranes," Nanoscale, vol. 8, 2016, pp. 7845-7848.
Li et al., "Autonomously Responsive Membranes for Chemical Warfare Protection," Advanced Functional Materials, 2020, 11 pages.
Tunuguntla et al., "Ultrafast proton transport in sub-1-nm diameter carbon nanotube porins," Nature Nanotechnology, Apr. 4, 2016, pp. 1-8.

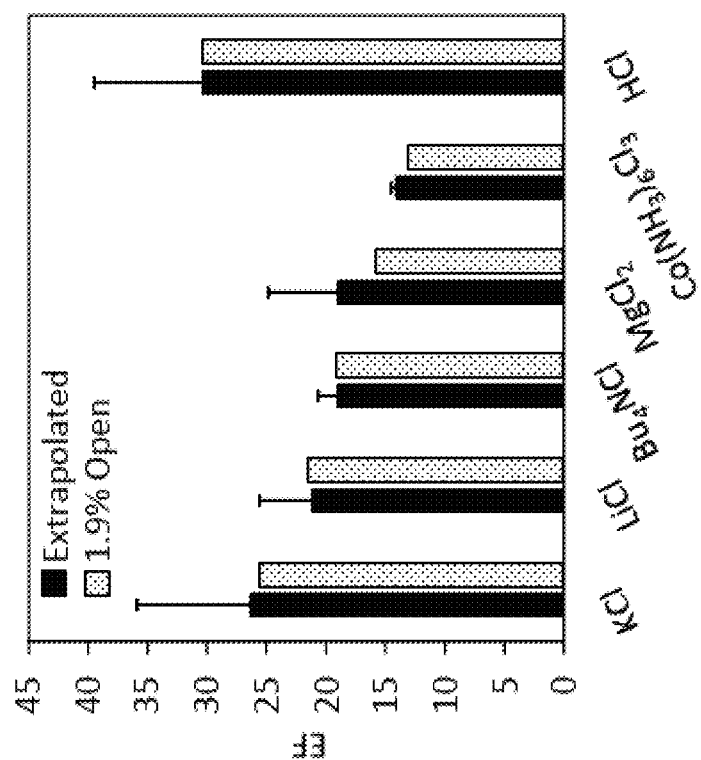
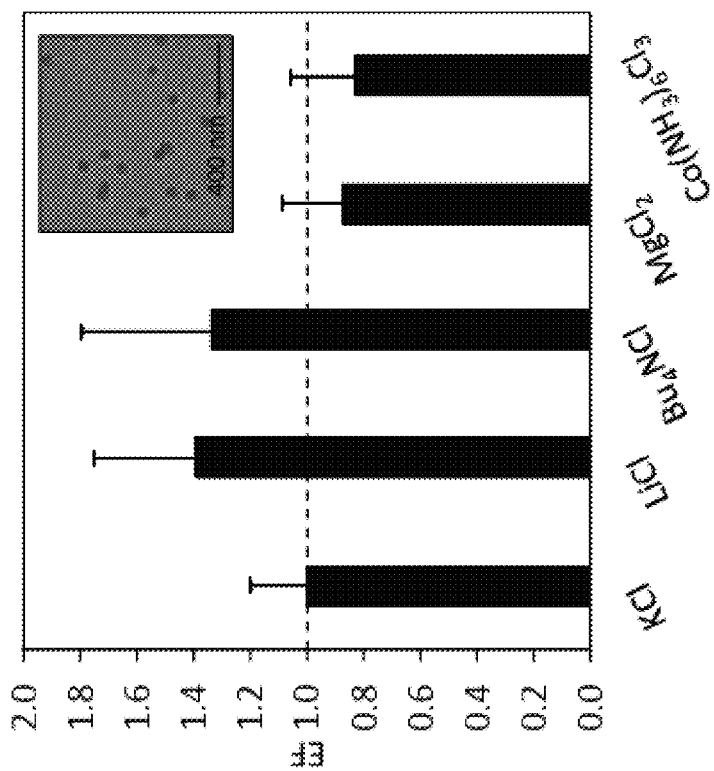
FIG. 14A
FIG. 14B

NANOPOROUS MEMBRANES FOR FAST DIFFUSION OF IONS AND SMALL MOLECULES

RELATED APPLICATION

This application is a Continuation in Part of U.S. patent application Ser. No. 15/441,153 filed Feb. 23, 2017, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to membranes, and more particularly, this invention relates to nanoporous membranes for concentration gradient separation applications.

BACKGROUND

Translation from the nanoscale into macroscale structures of the outstanding thermal, electrical, mechanical, and fluidic properties encountered in many nanomaterials promises to offer new solutions to long-standing challenges in materials science and technology. For membrane applications, materials with properties to overcome the typical trade-off between permeability and selectivity could provide major breakthroughs in several areas, from efficient water purification and energy harvesting, to low-cost separation of high-value chemicals, pharmaceuticals, and biological components.

Recent studies demonstrated that carbon nanotubes (CNTs) enable liquid and gas transport rates within their narrow core that are several orders of magnitude larger than expected for nanopores of similar sizes. Thus, (sub-) nanometer CNT pores have great potential for transforming separation applications if large-scale CNT membranes can be assembled. This ability of CNTs to sustain ultrafast rates of fluid transport is especially promising for the so-far unexplored yet critical field of breathable and protective fabrics. Recent world events, including viral epidemics (Ebola, SARS, avian flu) and the release of chemical warfare agents (sarin, sulfur mustard) in the ongoing Syria conflict, have highlighted the urgency to develop materials that can protect against hazardous agents to ensure the safety of civilian, medical, and military personnel.

To minimize physiological burden and prevent the risk of heat stress, a protective garment also has to allow facile perspiration and efficient heat loss from the body by evaporative cooling. Unfortunately, achieving both high protection and breathability (i.e. rapid water vapor transport) in a single material remains elusive. Current protective materials sacrifice breathability in order to prevent exposure to harmful agents. There are typically either impermeable barriers that entirely block penetration of chemical and biological hazards (but also of water vapor), or heavy-weight laminates containing adsorbents for harmful agents. Conversely, macroporous membranes with high permeability to moisture vapor and air offer poor protection. Indeed, because their ability to protect typically relies on hydrophobicity/oleophobicity, low-tension liquids can penetrate their porous network structure and potentially shuttle in other hazardous components. Furthermore, these macroporous materials are ineffective against vapor-phase threats.

Recent approaches to achieve adequate breathability in protective materials typically encompass selective monolithic membranes made of novel hydrophilic polymers, or multifunctional materials containing chemical groups/oxide nanoparticles with antibacterial or self-decontamination ability. An alternative route with truly transformative potential requires designing/fabricating smart dynamic materials that exhibit a reversible, rapid transition from a breathable state to a protective state triggered by environmental threats. These responsive membranes are expected to be particularly effective in mitigating physiological burden because a less breathable but protective state can be actuated locally and only when needed.

Semi-permeable membranes play a critical role in many natural and man-made processes by allowing molecular separation powered by diffusion across the membrane. Biological membranes, such as those found in the kidney and liver, possess complex transport mechanisms at the nanoscale which make it possible to achieve both a high level of control over the profile of permeating molecules and fast filtration rates. Synthetic materials aimed at reproducing these capabilities typically rely on selectivity induced by small pore diameters which results in limited permeabilities due to an unavoidable tradeoff between the two properties. Man-made membranes aimed at kidney replacement, for example, are unable to match the throughput of the kidney causing patients to spend extensive time in the hospital.

Analytical applications, such as ion chromatography, often require upstream sample preparation steps to increase target concentration, remove contaminants, etc. In some cases, dialysis is used for these upstream preparation steps however, the long duration to reach equilibrium causes a processing bottleneck. Ideally, an efficient dialysis process would eliminate the bottleneck of upstream preparation steps and increase the efficiency of the overall process.

Thus, for many reasons, it is highly desirable to develop an efficient permeable membrane for diffusion of nanoscale components.

SUMMARY

According to one embodiment, a product includes a nanoporous membrane having a plurality of carbon nanotubes and a fill material in interstitial spaces between the carbon nanotubes for limiting or preventing fluidic transfer between opposite sides of the nanoporous membrane except through interiors of the carbon nanotubes. The longitudinal axes of the carbon nanotubes are substantially parallel, an average inner diameter of the carbon nanotubes is about 20 nanometers or less, and both ends of at least some of the carbon nanotubes are open. Moreover, the fill material is impermeable or having an average porosity that is less than the average inner diameter of the carbon nanotubes.

According to another embodiment, a product includes a first chamber configured to receive a feed fluid, a second chamber configured to receive a permeate fluid, and a nanoporous membrane between the first and second chambers for transporting a component from the feed fluid under a concentration gradient. The nanoporous membrane includes a plurality of carbon nanotubes having substantially parallel longitudinal axes and a fill material in interstitial spaces between the carbon nanotubes for preventing fluidic transfer between opposite sides of the nanoporous membrane except through interiors of the carbon nanotubes. The average inner diameter of the carbon nanotubes is about 10 nanometers or less, both ends of at least some of the carbon nanotubes are open, and the fill material is impermeable. The component is at least one of the following: ions having an average diameter smaller than an average inner diameter of the carbon nanotubes, and molecules having an average diameter smaller than the average inner diameter of the carbon nanotubes.

According to yet another embodiment, a method includes adding a feed fluid to a first chamber and adding a permeate fluid to a second chamber, where the first and second chambers are separated by a nanoporous membrane configured for transporting a component from the feed fluid to the permeate fluid under a concentration gradient. The nanoporous membrane includes a plurality of carbon nanotubes having substantially parallel longitudinal axes and a fill material in interstitial spaces between the carbon nanotubes for preventing fluidic transfer between opposite sides of the nanoporous membrane except through interiors of the carbon nanotubes. The average inner diameter of the carbon nanotubes is about 10 nanometers or less, both ends of at least some of the carbon nanotubes are open, and the fill material is impermeable. The component is at least one of the following: ions having an average diameter smaller than an average inner diameter of the carbon nanotubes, and molecules having an average diameter smaller than the average inner diameter of the carbon nanotubes.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3E includes an inset of a high magnification of the area in the box.

FIG. 3F includes an inset of a photograph of a flexible, free-standing CNT-parylene composite according to one embodiment.

Figure 1:
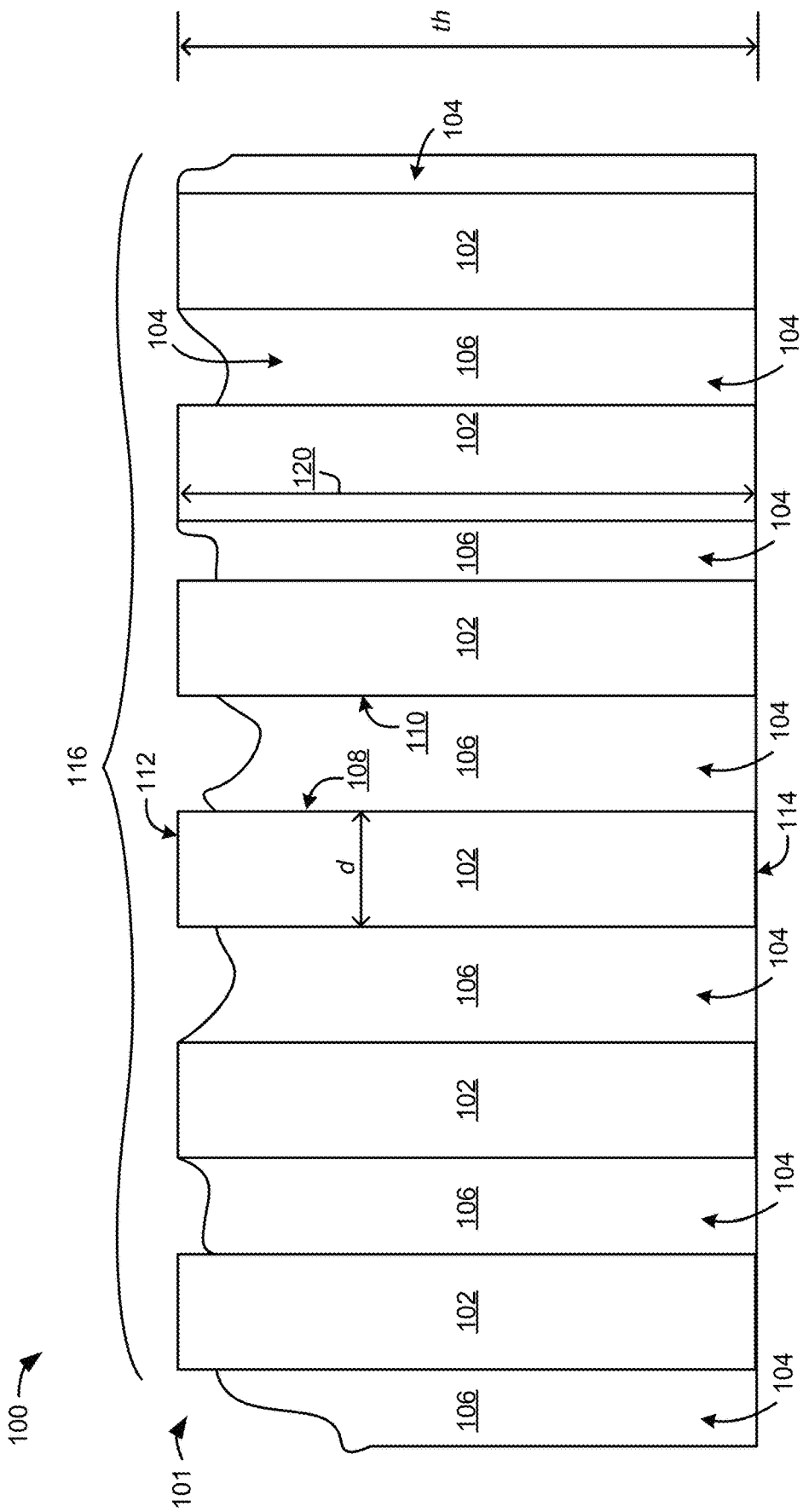
FIG. 1 is schematic drawing of a membrane according to one embodiment.

FIG. 8 is a plot of enhanced diffusion of small molecules/ions with respect to bulk, according to one embodiment.

FIG. 9 is a schematic drawing of a device for concentration-gradient driven separation of a component from a feed fluid, according to one embodiment.

FIG. 10 is a flow chart of a method for concentration-gradient driven separation of a component from a feed fluid, according to one embodiment.

FIGS. 11A-11C represent schematic pathways of fabrication of nanoporous membranes, according to one embodiment. FIG. 11A is a standard membrane, FIG. 11B is a Control Type 1 membrane, and FIG. 11C is a Control Type 2 membrane.

FIG. 12 is plot of nitrogen transport rates of nanoporous membranes during etching versus increasing etch thickness, according to one embodiment. Part (a) is a schematic drawing of a membrane having closed CNT channels. Part (b) is a schematic drawing of a membrane having 50% open CNT channels. Part (c) is a schematic drawing of a membrane having 100% open CNT channels.

FIG. 13A is a schematic drawing of a membrane with concentration boundary layers at its surfaces.

FIG. 13B is a plot of the measured transport rate enhancement factor with respect to bulk diffusion versus percent CNTs open in a membrane, according to one embodiment.

FIG. 13C is a plot of boundary layer resistance of polycarbonate membranes versus boundary resistance of carbon nanotube membranes for different small molecules and ions, according to one embodiment.

FIG. 14A is a chart depicting the enhancement factor for ion diffusion through polycarbonate membranes.

FIG. 14B is a chart comparing the enhancement factor for ion diffusion through CNT membranes obtained by extrapolation to 0% open CNT channels and directly from 1.9% open CNT channels, according to one embodiment.

FIG. 15 is a plot of the enhancement factor for salt diffusion through a CNT membrane versus the free energy of small molecule/salt transfer from bulk water to a confined nanopore environment, according to one embodiment.

FIG. 16A is a plot of a comparison of salt diffusion rates of a nanoporous membrane fabricated following the standard pathway to Control Membrane 1 and Control Membrane 2, according to one embodiment.

FIG. 16B is a chart of ion flux comparing control membranes to a nanoporous membrane with partially open CNTs and a nanoporous membrane with 100% open CNTs, according to one embodiment.

FIG. 17 is a plot of permeate conductivity versus time under a 50 mM KCl concentration gradient for a standard nanoporous membrane, Control Membrane 1, and Control Membrane 2, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Unless expressly defined otherwise herein, each component listed in a particular approach may be present in an effective amount. An effective amount of a component means that enough of the component is present to result in a discernable change in a target characteristic of the final product in which the component is present, and preferably results in a change of the characteristic to within a desired range. One skilled in the art, now armed with the teachings herein, would be able to readily determine an effective amount of a particular component without having to resort to undue experimentation.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

For the purposes of this application, room temperature is defined as in a range of about 20° C. to about 25° C.

For the purposes of this application, an order of magnitude is an approximation of the logarithm of a value relative to a contextually understood reference value, usually ten, interpreted as the base of the logarithm and the representative of values of magnitude 1. For example, one order of magnitude is referenced as 10 times (10×) a reference value, two orders of magnitude are referenced as 100 times (100×) a reference value, etc.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

The following description discloses several preferred embodiments of membranes with sub-20 nm carbon nanotube pores for concentration gradient-based separations, and/or related systems and methods.

In one general embodiment, a product includes a nanoporous membrane having a plurality of carbon nanotubes and a fill material in interstitial spaces between the carbon nanotubes for limiting or preventing fluidic transfer between opposite sides of the nanoporous membrane except through interiors of the carbon nanotubes. The longitudinal axes of the carbon nanotubes are substantially parallel, an average inner diameter of the carbon nanotubes is about 20 nanometers or less, and both ends of at least some of the carbon nanotubes are open. Moreover, the fill material is impermeable or having an average porosity that is less than the average inner diameter of the carbon nanotubes.

In another general embodiment, a product includes a first chamber configured to receive a feed fluid, a second chamber configured to receive a permeate fluid, and a nanoporous membrane between the first and second chambers for transporting a component from the feed fluid under a concentration gradient. The nanoporous membrane includes a plurality of carbon nanotubes having substantially parallel longitudinal axes and a fill material in interstitial spaces between the carbon nanotubes for preventing fluidic transfer between opposite sides of the nanoporous membrane except through interiors of the carbon nanotubes. The average inner diameter of the carbon nanotubes is about 10 nanometers or less, both ends of at least some of the carbon nanotubes are open, and the fill material is impermeable. The component is at least one of the following: ions having an average diameter smaller than an average inner diameter of the carbon nanotubes, and molecules having an average diameter smaller than the average inner diameter of the carbon nanotubes.

In yet another general embodiment, a method includes adding a feed fluid to a first chamber and adding a permeate fluid to a second chamber, where the first and second chambers are separated by a nanoporous membrane configured for transporting a component from the feed fluid to the permeate fluid under a concentration gradient. The nanoporous membrane includes a plurality of carbon nanotubes having substantially parallel longitudinal axes and a fill material in interstitial spaces between the carbon nanotubes for preventing fluidic transfer between opposite sides of the nanoporous membrane except through interiors of the carbon nanotubes. The average inner diameter of the carbon nanotubes is about 10 nanometers or less, both ends of at least some of the carbon nanotubes are open, and the fill material is impermeable. The component is at least one of the following: ions having an average diameter smaller than an average inner diameter of the carbon nanotubes, and molecules having an average diameter smaller than the average inner diameter of the carbon nanotubes.

A list of acronyms used in the description is provided below.

ALD atomic layer deposition
Au gold
$cm^{-1}$ per centimeter
CMP chemical mechanical planarization
CNT carbon nanotube
DMPC dynamic moisture permeation cell
EF enhancement factor
ePTFE expanded polytetrafluoroethylene
Fe/Mo iron/molybdenum
mL millilitre
MPa megapascal
MVTR moisture vapor transport rate
nm nanometer
qRT-PCR quantitative reverse transcription-polymerase chain reaction
RH relative humidity
$R_{BL}$ boundary layer resistance
$R_{CNT}$ resistance of CNT membranes
$R_{ePTFE}$ resistance of ePTFE membranes
$R_{tot}$ total resistance
SARS Severe Acute Respiratory Syndrome
SEM scanning electron microscopy
SWCNT single walled carbon nanotubes
SWNT single walled nanotubes TEM transmission electron microscopy
UV-vis ultraviolet-visible There is a need for protective yet breathable adaptive garments. Various embodiments described herein include a chemical threat responsive membrane based on two components: a highly breathable CNT-membrane that provides an effective barrier against biological threats; and a thin responsive functional layer grafted or coated on the membrane surface that either closes the CNT pore entrance upon contact with a chemical warfare agent or self-exfoliates in the region of contamination after neutralizing the threat.

Various embodiments described herein demonstrate fabrication of a flexible membrane with aligned, sub-5 nm CNT channels as moisture conductive pores. In some approaches, the membranes described below provide rates of water vapor transport that surpass those of commercial breathable fabrics, even though the CNT pores are only a few nm wide and the overall porosity may be less than 5.5%. Moreover, the membranes described herein may be fabricated over a large area in the dimensions of as large as several $m^2$.

Furthermore, quantifying the single-pore permeability to water vapor enables benchmarking the performance of these materials when a concentration gradient is used as a driving force. CNT nanochannels may sustain gas-transport rates exceeding Knudsen diffusion theory by more than one order of magnitude.

In addition, various embodiment demonstrate complete rejection of 2 nm charged dyes, 5 nm uncharged gold (Au) nanoparticles, and about 40-60 nm Dengue virus from aqueous solutions during filtration tests. Thus, some embodiments described herein demonstrate effective protection from biological threats by size exclusion rather than by merely preventing wetting.

FIG. 1 depicts a product 100 for an ultra-breathable and protective membrane, in accordance with one embodiment. As an option, the present product 100 may be implemented in conjunction with features from any other embodiment listed herein, such as those described with reference to the other FIGS. Of course, however, such product 100 and others presented herein may be used in various applications and/or in permutations which may or may not be specifically described in the illustrative embodiments listed herein. Further, the product 100 presented herein may be used in any desired environment.

According to one embodiment illustrated in FIG. 1, a product 100 includes a nanoporous membrane 101 having a plurality 116 of CNTs 102 having sidewalls 108, 110, and a fill material 106 in interstitial spaces 104 between the CNTs 102 for limiting or preventing fluidic transfer between opposite sides of the nanoporous membrane 101 except through interiors of the CNTs 102. Moreover, longitudinal axes 120 of the CNTs 102 may be substantially parallel. For example, the CNTs may form a "forest" of CNTs and the forest may cover the area of the thickness of the membrane. In some approaches, CNTs of the nanoporous membrane may represent vertically aligned, single-walled carbon nanotubes (VA-SWCNT).

In various embodiments, the sidewalls of the CNTs may be primarily one carbon atom thick, but could be higher, e.g., 2 or more atoms thick.

The average inner diameter d of the CNTs 102 may be about 20 nanometers or less, where the average inner diameter d may be the average considering all, or a large sampling, of the CNTs 102 in an array 116 (rather than a diameter d along the longitudinal axis 120 of each CNT 102). In some approaches, the inner diameter d may be about the same as the outer diameter. In one approach, the average inner diameter of the CNTs 102 may be about 10 nm or less. In other approaches, the average inner diameter d of the CNTs 102 may be less than about 6 nanometers. In yet other approaches, the average inner diameter d of the CNTs 102 may be less than about 4 nm. In yet other approaches, the average inner diameter d of the CNTs 102 may be greater than about 1 nm. In one approach, diffusion occurs in CNT having carbon nanotube channels with an average diameter for each CNT in a range of 0.8 nanometers (nm) to 10 nm in diameter but may be larger or smaller.

According to one embodiment of product 100, both ends 112, 114 of some or all of the CNTs 102 may be open. In some approaches, greater than 2% to less than 100% of the carbon nanotube have both ends open. In other approaches, less than 95% of the carbon nanotubes have both ends open.

Furthermore, the fill material 106 may be impermeable to anything. In another approach, the fill material 106 may be impermeable to anything other than water vapor or smaller molecules and/or ions. In further approaches, the fill material 106 may have an average porosity that is less than the average inner diameter d of the CNTs 102. In other approaches, the fill material 106 may exclude chemicals based on a mechanism other than size exclusion. For example, but not limited to, the fill material may block chemicals that are not soluble in the filling material even though the size of the chemical may be similar to the size of water vapor.

In some embodiments, the fill material 106 may be permeable. In some approaches, the fill material is permeable for water vapor, where the fill material may be impermeable to chemicals and molecules, for example but not limited to biologicals (e.g., pathogens, pollen, spores, etc.), which typically have a size larger than a water molecule.

In other embodiments, the fill material may be selectively permeable, being permeable for water vapor, while providing a chemical barrier to chemicals and/or biologicals, e.g., as in the following examples. In some approaches the fill material may have selective permeability properties that include low permeability to chemicals (e.g., less than 10% permeability), for example a low solubility, a low diffusivity, or a combination of both thereof. In other approaches, the fill material may react with the chemicals and neutralize the chemical activity. In yet other approaches, the fill material may block chemicals and/or biologicals of interest altogether, while being permeable for water vapor.

The fill material 106 may be constructed of any suitable material that would become apparent to one skilled in the art reading the present disclosure. In some approaches, the fill material may be polymeric. In other approaches, the fill material may be ceramic.

In various embodiments, the density of the CNTs 102 is in a range of $10^{11}$ and $10^{13}$ CNTs per square centimeter, for example, the CNTs may form a forest of CNTs that cover the entire thickness of the membrane.

The thickness th of the nanoporous membrane 101 may be in a range of 1 to 500 micron (μm). The thickness th is measured from one end of a CNT 102 to the opposite end of the CNT 102 in a direction along the longitudinal axis 120 of the CNT 102. The thickness th may be an average thickness of the membrane 101.

In various embodiments, transport of gas and/or liquid occurs through the CNTs. In some approaches, water vapor transport through the single-walled nanotubes (SWNTs) of the CNT membrane may be driven by a relative humidity gradient. In other approaches, the CNT membranes with <5 nm conductive pores may exhibit outstanding moisture vapor transport rates (MVTR), for example but not limited to MVTR approaching 8000 g/m²d while rejecting ≥5 nm analytes by size exclusion.

In various embodiments, a concentration gradient may be used as a driving force such that CNT nanochannels in the membranes may sustain gas-transport rates that exceed Knudsen diffusion theory (as discussed further below) by more than one order of magnitude. Furthermore, the CNT membranes may provide rates of water vapor transport that surpass conventional breathable fabrics, even though the CNT pore size of the CNT channels may be only a few nm wide and the overall porosity in a range of greater than 0 to 15%, and preferably in the range of about 1% to about 5%.

Moreover, the CNT pores may be narrow and may block biological threats like viruses and bacteria by size exclusion.

Figure 2:
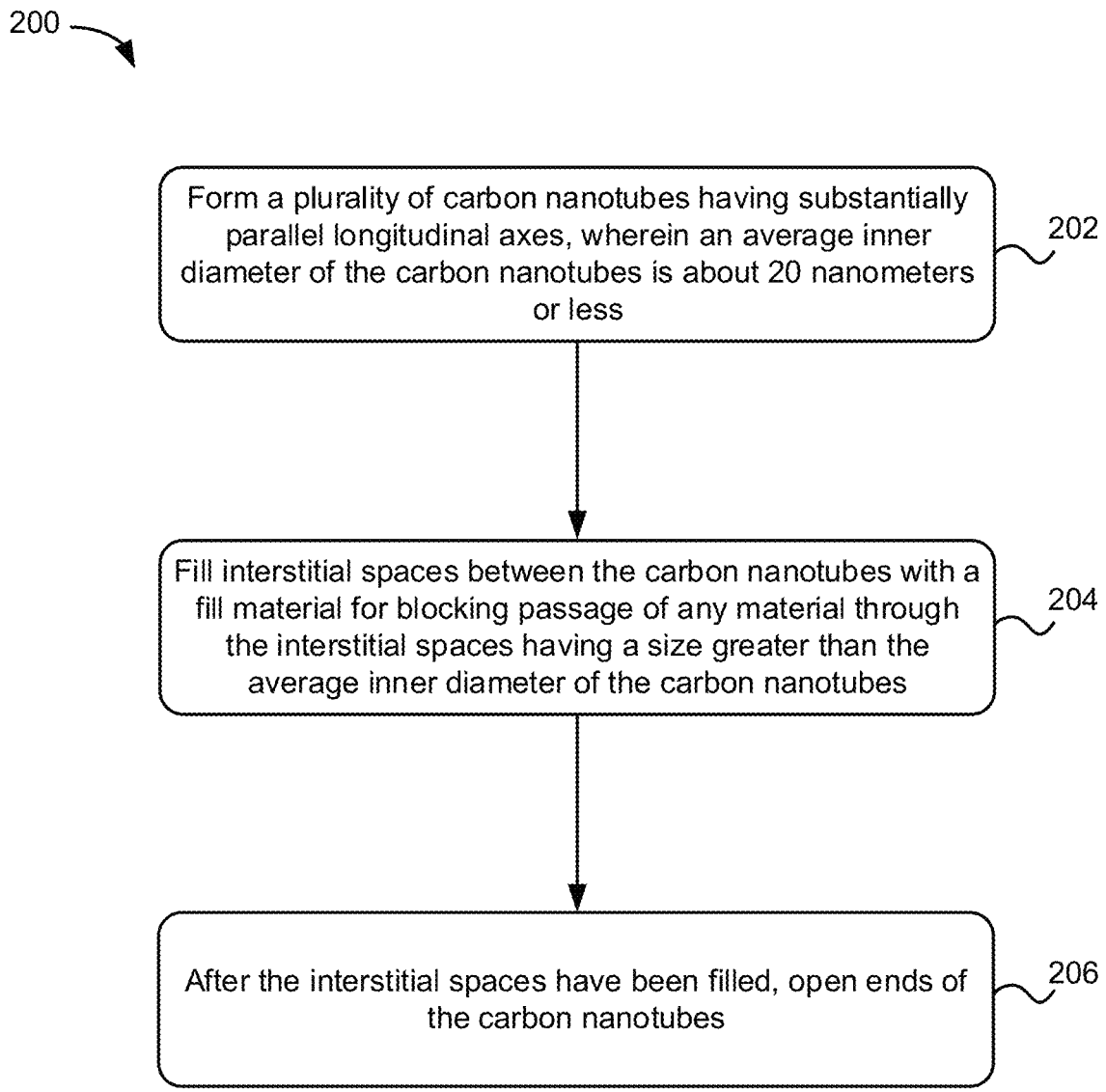
FIG. 2 is a flowchart of a method according to one embodiment.

FIG. 2 shows a method 200 for forming a plurality of CNTs, in accordance with one embodiment. As an option, the present method 200 may be implemented for forming products such as those shown in the other FIGS. described herein. Of course, however, this method 200 and others presented herein may be used to form a structure which may or may not be related to the illustrative embodiments listed herein. Further, the methods presented herein may be carried out in any desired environment. Moreover, more or less operations than those shown in FIG. 200 may be included in method 200, according to various embodiments. It should also be noted that any of the aforementioned features may be used in any of the embodiments described in accordance with the various methods.

According to one embodiment as shown in the diagram in FIG. 2, method 200 begins with step 202 of forming plurality of CNTs having substantially parallel longitudinal axes, where an average inner diameter of the CNTs may be in a range of about 20 nanometers to greater than about 1 nm.

Known techniques may be used to form the plurality of CNTs. In some embodiments, the method to grow the CNTs may involve a single metal catalyst layer, for example but not limited to iron (Fe), cobalt (Co), nickel (Ni), platinum (Pt), etc. In other embodiments, the method to grow the CNTs may involve a bimetallic catalyst layer, for example, but not limited to Co-molybdenum (Co—Mo), Fe—Mo, Ni—Mo, Fe—Co, Co-copper (Co—Cu), etc.

In various embodiments, CNTs may be grown as a forest of CNTs on a large scale, for example, wafer scale of 4 to 6 inches. In some approaches, the CNT forests may be grown on a larger scale. In other approaches, the CNTs may be grown on a smaller scale. The area of the CNT forest may depend on the size limit of the growth chamber and the substrate.

In various embodiments, the height of the CNTs may be grown in the range of about 1 µm to about 1 mm or more in vertical height. In some embodiments, the CNTs may grow to about 20 to 30 µm in height.

Figure 3C:
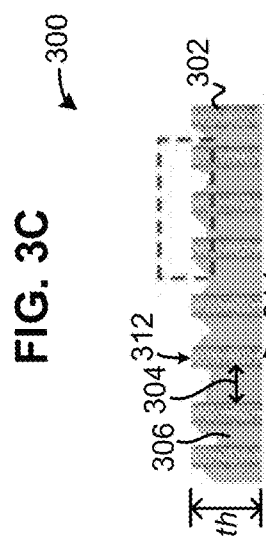
FIGS. 3A-3C are schematic drawing of a method to form a membrane according to an exemplary embodiment.
Figure 3B:
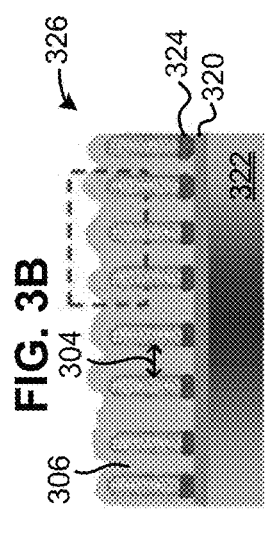
Figure 3A:
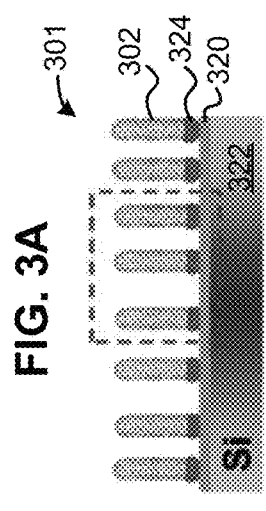
Figure 3F:
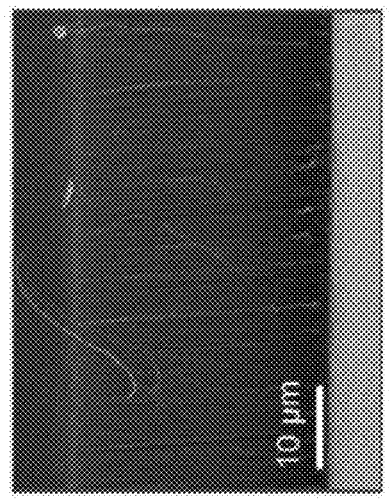
FIG. 3F is a scanning electron micrograph of the top surface of the membrane after etching, according to one embodiment.
Figure 3E:
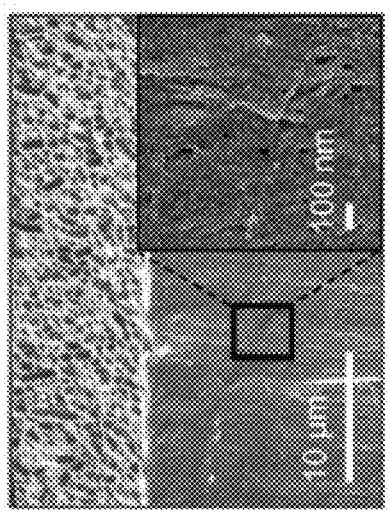
FIG. 3E is a scanning electron micrograph of a CNT-parylene composite before etching according to one embodiment.
Figure 3D:
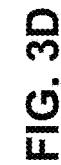
FIG. 3D is a cross-sectional scanning electron micrograph of a CNT forest according to one embodiment.

FIGS. 3A-3F show an exemplary embodiment of method 200. A schematic representation of step 202 is shown in FIG. 3A in which vertically aligned CNT 302 forests 301 may be synthesized from an Fe/Mo catalyst layer 324 on a substrate 322, that may be a silicon wafer, using atmospheric-pressure chemical vapor deposition with ethylene as the carbon source. FIG. 3D shows a scanning electron micrograph (SEM) image of a cross-section of a CNT forest 301 (represented by the dashed square of FIG. 3A), according to one embodiment.

In some approaches, the diameter of the CNTs may be tuned according to the size of the particles with which the CNTs are grown. For example, larger particles may result in larger diameter tubes, and smaller particles may result in smaller diameter tubes. In other approaches, the diameter of the CNTs may be tuned according to the amount of carbon added to the growing step. For example, if the particles are starved of carbon, then smaller CNTs may be fabricated, but if a higher amount of carbon is added, then larger CNTs may be fabricated.

Figure 4B:
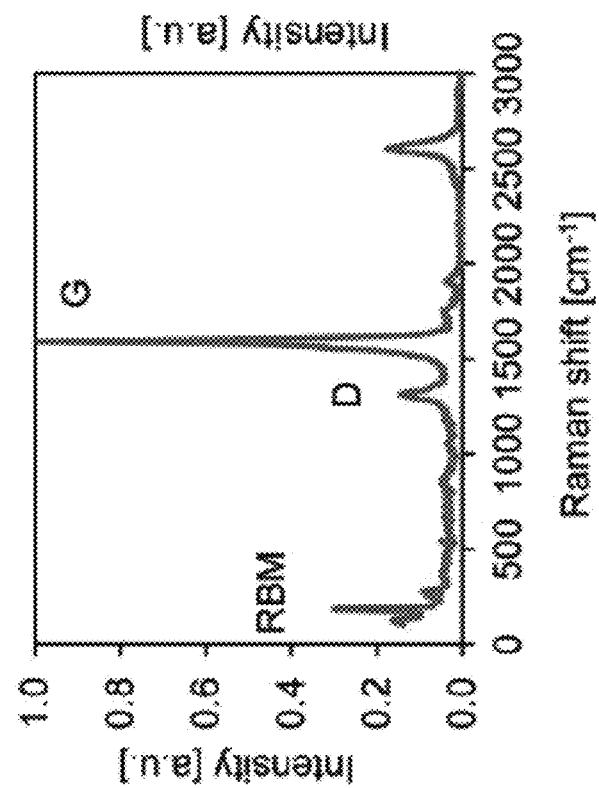
FIG. 4B is plot of Raman spectroscopy of a typical SWNT forest, according to one embodiment.
Figure 4A:
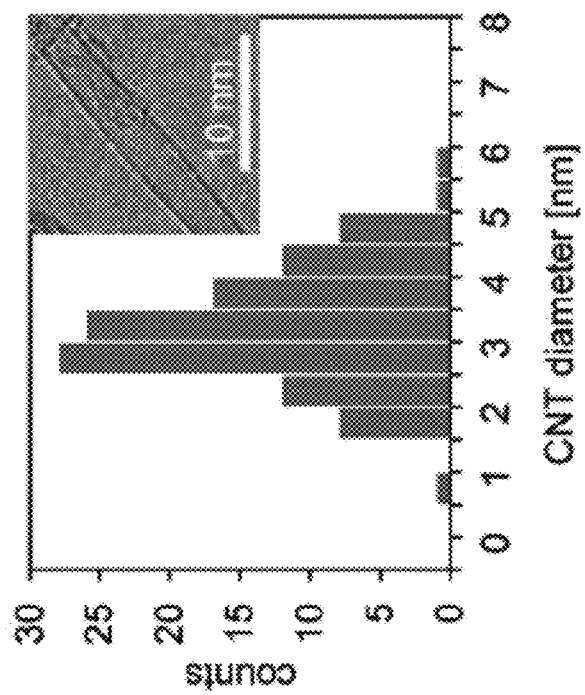
FIG. 4A is a plot of CNT diameter distribution measured from high-resolution TEM images of CNTs harvested from a CNT forest, according to one embodiment.

FIG. 4A shows a high-resolution transmission electron microscopy (TEM) analysis of CNTs formed as described in step 202 of method 200, according to one embodiment. Analysis shows that the CNTs are SWNTs with diameters in the range of 1-5 nm (3.3 nm average). In addition, these pore sizes (1-5 nm) are smaller than typical dimensions of viruses and bacteria and thus, the CNTs may block biological threats.

The graph in FIG. 4B confirms the presence of small-diameter tubes formed by the CNT fabrication process (step 202 of method 200, FIG. 2) by Raman spectroscopy analysis. The graph of Raman spectroscopy shows sharp radial breathing modes (RBM) of intensity (y-axis) in the 100 to 300 cm$^{-1}$ wavenumber region (x-axis). The measured peak intensity ratios of G-band (at about 1590 cm$^{-1}$) and D-band (at about 1310 cm$^{-1}$) are high and typically in the range of 5-10, thus confirming the high graphitization of fabricated CNT channels.

The density of CNTs in the membrane may correlate with the size of the CNTs. For example, smaller tubes may generate a higher density membrane.

Looking back to FIG. 2, step 204 of method 200 involves filling interstitial spaces between the CNTs with a fill material for blocking passage of any material through the interstitial spaces having a size greater than the average inner diameter of the CNTs. In various embodiments, the fill material may be any polymer that can infiltrate a CNT forest and has at least one of the following characteristics: non-permeable to chemicals and/or biological threats, permeable with water vapor or liquid, and depositable with vapor phase deposition. For example, but not limited to, in the application of the membrane as breathable fabric, a fill material that blocks any unwanted chemicals or bio-molecules, regardless of size, as well as liquid water may be preferable. For other applications, for example, water purification, a porous fill material may be preferable.

In a preferable embodiment, the fill material may be flexible, e.g., resiliently deformable. For example, if the membrane is used in a breathable fabric, a flexible fill material is preferred. In other approaches where the membrane may be used as a type of shield on a building or device, the fill material may be rigid and/or hard in the final form.

Examples of fill material may include polymers, for example, parylenes, polyurethanes, polyamides, epoxy, etc.; ceramics; nitrides, for examples, silicon nitride ($Si_3N_4$); metal oxides, for example titanium oxide ($TiO_2$), etc.; oxides of metalloids, for example, silicon oxide ($SiO_2$), etc.; etc. Examples of selectively permeable fill material that allows some water vapor permeability but provides a chemical barrier to chemicals (e.g. unwanted chemical warfare agents) and/or biologicals, regardless of size, may include polymers such as polyamines, sulphonated polymers, polymers containing fluorinated sulphonic acids, Chitosan, polyvinyl alcohol, polyalkylene-imine, etc.

In various embodiments, methods to fill the interstitial spaces between the CNTs as described by step 202 of method 200 may include atomic layer deposition (ALD), initiated chemical vapor deposition, polymer melting, spin-coating, dipping, etc. and combinations thereof.

FIG. 3B shows a schematic representation of step 204 (FIG. 2), according to an exemplary embodiment, in which the interstitial spaces 304 surrounding the CNT 302 may be filled with parylene-N material 306 by conformal coating from the vapor phase under vacuum and at room temperature, according to an exemplary embodiment. FIG. 3E shows a SEM image of a CNT-parylene composite 326 (represents the dashed square of FIG. 3B) following infiltration of the CNT 302 forests with parylene-N material 306, according to an exemplary embodiment. The high magnification SEM image inset (100 nm) of FIG. 3E shows a good conformal coating of the CNTs 302 after polymer deposition (for example, parylene-N material 306). The SEM image of the surfaces (top third portion of FIG. 3E) and cross sections (bottom two-thirds portion of FIG. 3E) of the CNT-parylene composite 326 shows efficient filling of the gaps (interstitial spaces 304) between CNTs 302 by the polymeric matrix (for example, parylene-N material 306) while maintaining vertical alignment of the native CNT forests 301 (FIG. 3D).

Efficient polymer infiltration (as shown in FIG. 3B) not only may ensure fluidic transport occurs through the inner core of the CNT nanochannels, but also the resulting CNT-parylene composites may display mechanical properties that are important for the application of the membranes as garment components. For example, various embodiments of fabrication of CNT-parylene composites show relatively high tensile strength (about 9±3 MPa) and elastic modulus (about 382±190 MPa).

Looking to FIGS. 3A and 3B, the CNTs may be formed on a release layer 320. In various embodiments, the release layer 320 may include material that may be dissolved by treatment with acid or base, for example alumina, oxides, etc. The CNT forests 301 infiltrated with fill material 306 may be released from the substrate 322 by dissolving the release layer 320 in acid or base, depending on the material of the release layer.

Referring back to FIG. 2, step 206 of method 200 involves opening ends of the CNTs. In various embodiments, the process to open the ends of the CNTs may be appropriate to the type of infiltrating material, for example but not limited to, etching, dissolution, lapping by process such as chemical mechanical planarization (CMP), etc.

FIG. 3C shows a schematic representation of step 206 (FIG. 2), according to an exemplary embodiment, in which the CNT-parylene composite 326 of FIG. 3B may be released from the substrate 322 (silicon wafer) by soaking in an acidic solution. Methods to remove excess parylene and to open the CNT 302 tips on either end 312, 314 may include reactive ion etching, air-plasma treatment, etc. The resulting structure 300 as shown in FIG. 3C may be a CNT-parylene composite that includes CNTs 302 with parylene-N material 306 infiltrated in the interstitial spaces 304 between the CNTs 302.

FIG. 3F shows a SEM image of the top portion of the CNT-parylene composite 300 as represented by the dashed square in FIG. 3C. The inset of FIG. 3F shows a photograph of a flexible, free-standing CNT-parylene composite 300, according to one embodiment.

In various embodiments as shown, for example, in FIG. 3C, the CNTs 302 of the CNT-parylene composite 300 may function as low-tortuosity fluidic conduits, through the individual CNTs 302 that span the entire membrane thickness th. In other words, there is a low level of curvature (or tortuosity) of the path fluid may follow when entering the open top end 312, spanning the thickness th of the membrane, and exiting the open bottom end 314. For example, the tortuosity ($\tau$=1.25) of the CNTs was quantified from the anisotropy of the small-angle X-ray scattering pattern along the azimuthal angle $\phi$, which was collected with the incident X-ray beam orthogonal to the vertically aligned forest 301.

In some studies, application of conditions such as pressure and voltage differentials results in enhanced flow through CNTs above comparably sized pores. For example, under a pressure driving force, enhancements range through CNTs from one to two orders of magnitude for gas flow and three to five orders of magnitude for water flow compared with Knudson and Hagen Poiseuille models, respectively. Under a voltage driving force, ion mobilities several orders of magnitude above bulk have been demonstrated under some conditions. In the case of a concentration driving force, however, whether concentration-driven transport through CNTs is enhanced above expectations from classical theories is less understood.

In contemplated approaches, water vapor transport may exhibit a rate at least 24 times larger than estimates based on pore size alone. However, it is generally understood that the diffusion of small molecules/ions through CNTs typically follows bulk or hindered diffusion-based models.

As shown in FIGS. 3D-3F, according to one embodiment described herein a robust, high density, flexible nanoporous membrane may be fabricated. Briefly, by way of example and not meant to be limiting in any way, FIG. 3D illustrates the CNT forest growth with CNTs having an average diameter of approximately 1 nanometer (nm). Measurement of the weight gain of the silicon wafer after growth indicates a number density of approximately $10^{12}$ cm$^{-1}$. FIG. 3E illustrates matrix deposition, for example parylene deposition. Following matrix deposition, reactive ion etching to remove the caps of the CNTs and alumina dissolution for membrane film delamination result in the described nanoporous membrane.

In one approach, measuring pressure-driven gas diffusion rates (e.g., transport rates) of the nanoporous membrane having different extents of reactive ion etching allows estimation of the number of transporting CNTs in the membrane. A curve may be plotted of gas diffusion rates (e.g., transport rates) of a nanoporous membrane versus etch thickness (e.g., extent of etching). At the plateau of the highest diffusion rates with increasing etching, the membrane likely has all CNTs open as indicated by no further increase in diffusion rates that would reflect additional open CNT channels, see FIG. 12 as an example (Discussion in Experiment section).

As described herein the measured transport rates may be understood with a resistance in series model of mass transfer, which includes the intrinsic membrane resistance and the boundary layer resistances. Various approaches described herein provide the surprising and unexpected result of faster diffusion in the CNT membrane than in the bulk fluid. As a result, the membrane resistance is small when a large fraction of CNTs are open, and the boundary layer resistance is expected to dominate the total mass transfer resistance in fully open CNT membranes. As is generally understood, a boundary layer tends to form on a membrane during diffusion separations, the boundary layer being caused by the build-up of molecules/ions that cannot pass rapidly through the membrane, thereby creating a concentration gradient. Typically, the boundary layer reduces the flow of the component to be separated from the bulk solution through the pores of the membrane. Molecules having a diameter as small as a tenth of the average diameter of the pores of the membrane may create a hindered diffusion layer thereby affecting the flux of the component through the membrane.

The nanoporous membranes described herein may rely solely on a concentration gradient as a driving force, having approximately equal pressures on both sides of the membrane. Once the measured transport rates are corrected for the contribution of the boundary layer resistance, the diffusion rate of a component through the nanoporous membrane is higher than the diffusion rate of the component in the bulk fluid. Surprisingly, the membrane does not appear to follow the expected hindered diffusion model, but rather the ions and/or molecules move more quickly through the pores than they do through the bulk fluid. This result was not expected nor predictable.

Accordingly, nanoporous membranes enable ions and small molecules to diffuse under a concentration gradient at rates significantly faster than in bulk solutions, and faster than is possible in currently existing materials. In one approach, these membranes may be fabricated with a large but approximately known number of single-walled carbon nanotubes (SWCNT) as fluid transport pathways. Contrary to conventional membrane systems, nanoporous membranes as described herein minimize uncertainties in the calculation of the per-pore flow rate. A series of novel and stringent control experiments were performed to rule out the possibility of defects at all scales, including those smaller than the pore openings, and confirms that this faster transport occurs only through single-walled CNTs.

Measurements of rate of diffusion of small ions in single-walled carbon nanotubes with average diameters in a range from greater than about 0.8 nm to about 10 nm and average lengths up to 500 microns (μm) were found to be one to two orders of magnitude larger than the rate of diffusion of the ions in the bulk fluid. Likewise, single-walled carbon nanotubes with larger average diameters are expected to provide progressively slower but still enhanced transport.

In some approaches, diameter of the CNTs may be a determinant for optimal transport of a component through a membrane. In one approach, the average diameter of the CNTs may have a greater effect of efficient transport of a component through a membrane compared to the length of the CNTs (e.g., thickness of the membrane). In another approach, for a given CNT length, an average diameter of the CNTs may be determined for optimal transport of a component through a membrane. For example, CNTs having smaller diameters may likely exhibit larger enhancements of transport. Without wishing to be bound by any theory, it is believed that the effect may likely decrease rapidly for CNTs having an average diameter >10 nm. Moreover, for a given CNT diameter and increasingly large CNT lengths, the enhancement magnitude compared to bulk diffusion is expected to plateau to a level that corresponds to the maximum achievable for that CNT diameter. Moreover, a choice of the average diameter of the CNTs may depend on the molecules to be separated from a mixture, for example, a fast-diffusing species that could fit inside the CNTs. In further considerations, an optimal diameter of the CNTs may depend on other components in the mixture beyond the component being separated, targeted transport rate and selectivity of components (e.g., what can pass through and what cannot), etc.

According to various embodiments described herein, a synthetic membrane with nanometer scale pore diameters (e.g., a nanoporous membrane) provides enhanced diffusive transport and has the potential to benefit natural and man-made processes. In one embodiment, nanoporous membranes may enable dialysis processing with unprecedented efficiency.

Various membranes described herein may be used in dialysis driven separation technologies. CNTs have structural features that enable selective yet rapid transport, namely a small tunable diameter, easily functionalized tips, and a smooth, well-defined interior. The approaches described herein using CNTs as membrane pores offer a desirable advantage for dialysis-driven technologies to enable fast diffusion rates without having to increase pore diameters. In one approach, a nanoporous membrane offers enhanced diffusion via CNT pores compared to a pore/ion size system in which diffusion may be typically lower than bulk. Moreover, when compared to conventional membranes following the hindered diffusion model and having similar pore diameter distribution, the nanoporous membrane may enable sharper cut-off transitions between ions/small molecules that pass through and those that cannot pass through. This is desirable for many dialysis driven technologies.

According to various approaches described herein, ion/small molecule diffusion rates in CNT nanochannels are above the diffusion rate thereof in the bulk solution. Concentration driven separation occurs via transportation pathways through high density, vertically aligned, single walled carbon nanotubes (VA-SWCNT) of the nanoporous membranes. The membranes having VA-SWCNT transport pathways enable diffusion rates of ions and small molecules through the pores at rates that are greater than an order of magnitude above the diffusion rate in bulk solution.

According to one embodiment, the nanoporous membrane may be characterized by exhibiting a rate of diffusion of a component of a feed fluid through the nanoporous membrane, under a concentration gradient, that is greater than one times (1×) the bulk diffusivity of the component. In one approach, the rate of diffusion of a component may be greater than 2× the bulk diffusivity of the component. In one approach, the diffusion may occur in the absence of a pressure gradient, voltage gradient, or a combination thereof. The rate of diffusion of a component may be defined as the transport of a component across a nanoporous membrane, not including transport across any boundary layers present.

The bulk diffusivity is a proportionality constant that relates the transport rate of a component to a chemical potential gradient in a bulk environment. For the purposes of this disclosure bulk diffusivity may further be defined as the proportionality constant that relates the transport rate of a component through a bulk liquid to a concentration gradient in that liquid.

In one approach, the rate of diffusion of the component through the nanoporous membrane may be at least one order of magnitude (10×) the bulk diffusivity of the component. In one approach, the rate of diffusion of the component through the nanoporous membrane may be at least 20 times (20×) the bulk diffusivity of the component. In one approach, the rate of diffusion of the component through the nanoporous membrane may be up to 40 times (40×) the bulk diffusivity of the component.

In some approaches, a nanoporous membrane may be designed for diffusion of more than one component.

The component may include ions having an average diameter smaller than an average inner diameter of the carbon nanotubes, molecules having an average diameter smaller than the average inner diameter of the carbon nanotubes, or both.

It was surprising that the nanoporous membrane having CNTs with nanometer diameters demonstrated solute diffusion rates under a concentration gradient greater than the diffusion rates in the bulk solution. It is generally understood that components diffuse through a nanoporous membrane at rates that are equal to or lower than the diffusion rate of the components in the bulk fluid. This is due to the combined result of an increase in the hydrodynamic drag due to the pore wall and steric restriction imposed by the pore wall on the volume available for diffusion to the solute. As a result, the smaller the pore diameter, the smaller the diffusion rate is expected to be compared to bulk diffusivity. Without wishing to be bound by any theory, it is believed that the nature of the CNT transport pathway contributes to the increased diffusion rate.

In batch mode approaches, a concentration boundary layer may build up at the membrane interfaces that slows down the component transport rate across the membrane. For continuous systems that include continuously fed feed solution and permeate solution, the system reaches a steady state with a constant boundary layer resistance. This boundary layer resistance is factored out of calculations of enhancement factor (EF) in order to extract the resistance of the membrane alone. Hence, the enhanced transport through the nanoporous membrane described herein is independent of the boundary layer. Thus, the nanoporous membrane exhibits a rate of diffusion of the component through the nanoporous membrane that is maintainable at or above at one times (1×), two times (2×), 3×, up to 20×, up to 40× of the bulk diffusivity of the component in the feed fluid.

In various embodiments, the CNT membrane demonstrates a greater than 10× rate of diffusion of standard electrolytes compared to the rate of diffusion thereof in the bulk solution. In one approach, the CNT membrane demonstrates a greater than 20× diffusion rate of standard electrolytes compared to the rate of diffusion thereof in the bulk solution. Illustrative ions and small molecules shown via experimentation to achieve at least one order of magnitude higher rate of diffusion through the VA-SWCNT channels of a membrane include KCl, NaCl, $Bu_4NCl$, $MgCl_2$, $Co(NH_3)_6Cl_3$, $K_4Fe(CN)_6$, etc. Similar results are expected for most, if not all, molecules and ions of similar or smaller size relative to the average inner diameter of the VA-SWCNTs.

Figure 8:
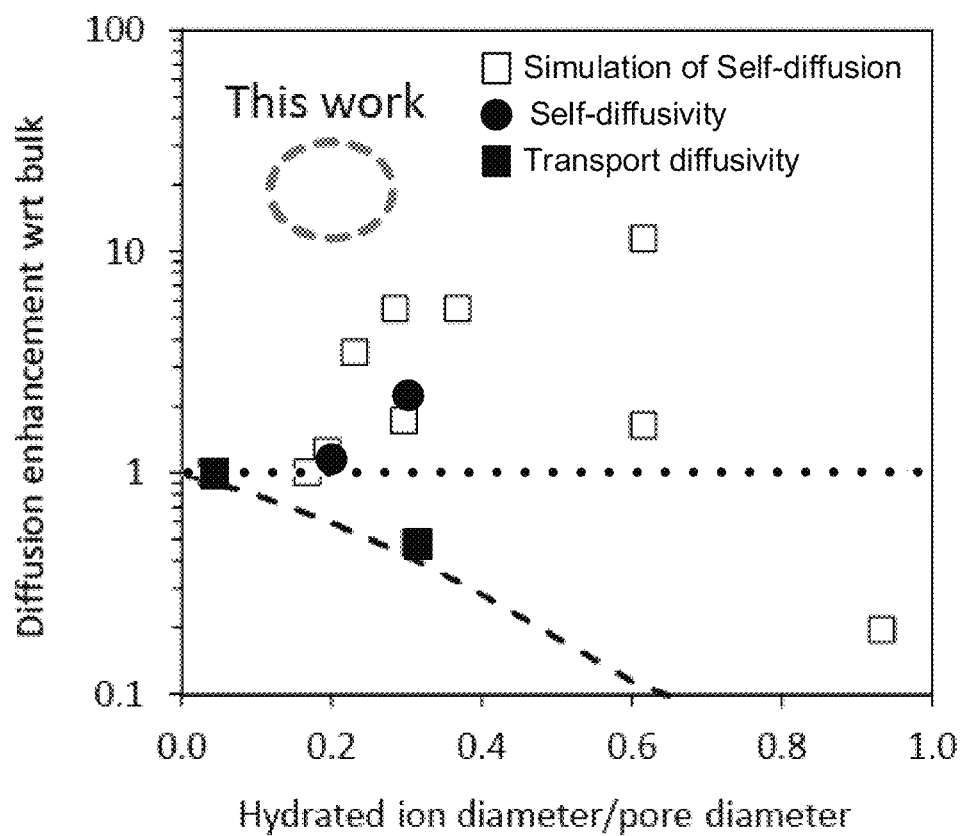
Figure 15:
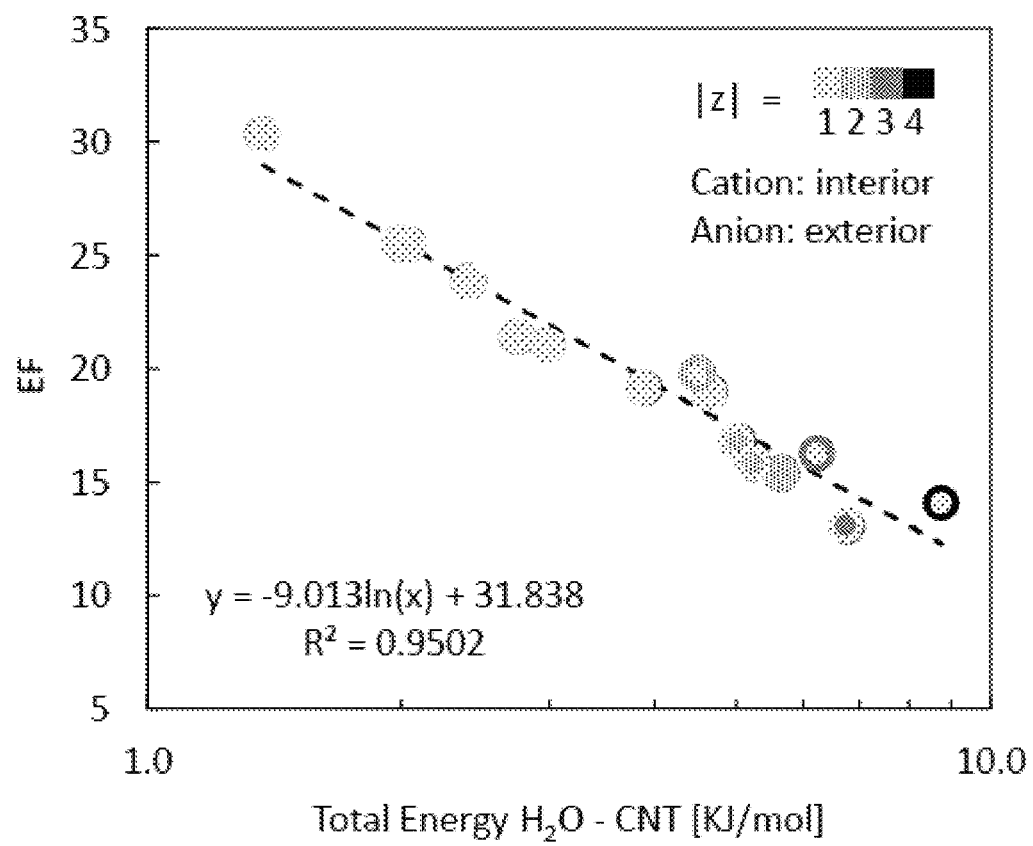

As described herein, a comparable ion and pore size may typically result in hindered diffusion in which the diffusion of a particle from bulk solution may be slowed as the particle moves within a pore of a membrane. According to various approaches described herein, diffusion of ions is enhanced (FIG. 14B) and does not show effect of hindered diffusion through the pores of the CNT membrane even if the sizes of the ion/small molecule and pores are comparable (FIG. 8). Moreover, enhanced diffusion of ions in CNT membrane scales with energy cost for ions to enter the CNTs (FIG. 15).

FIG. 8 depicts a plot of diffusion enhancement with respect to bulk relative to hydrated ion diameter/pore diameter. The nanoporous membrane as described herein displays significant enhancement of diffusion relative to bulk (dotted line at 1) and hindered transport model predictions (dashed line). Previous studies of transport diffusivity measurements (■) and self-diffusivity data (●) reported no or very small enhancement, respectively. Simulation results (□) for self-diffusion are closer, but still lower than transport diffusivity with the nanoporous membranes described here.

Figure 9:
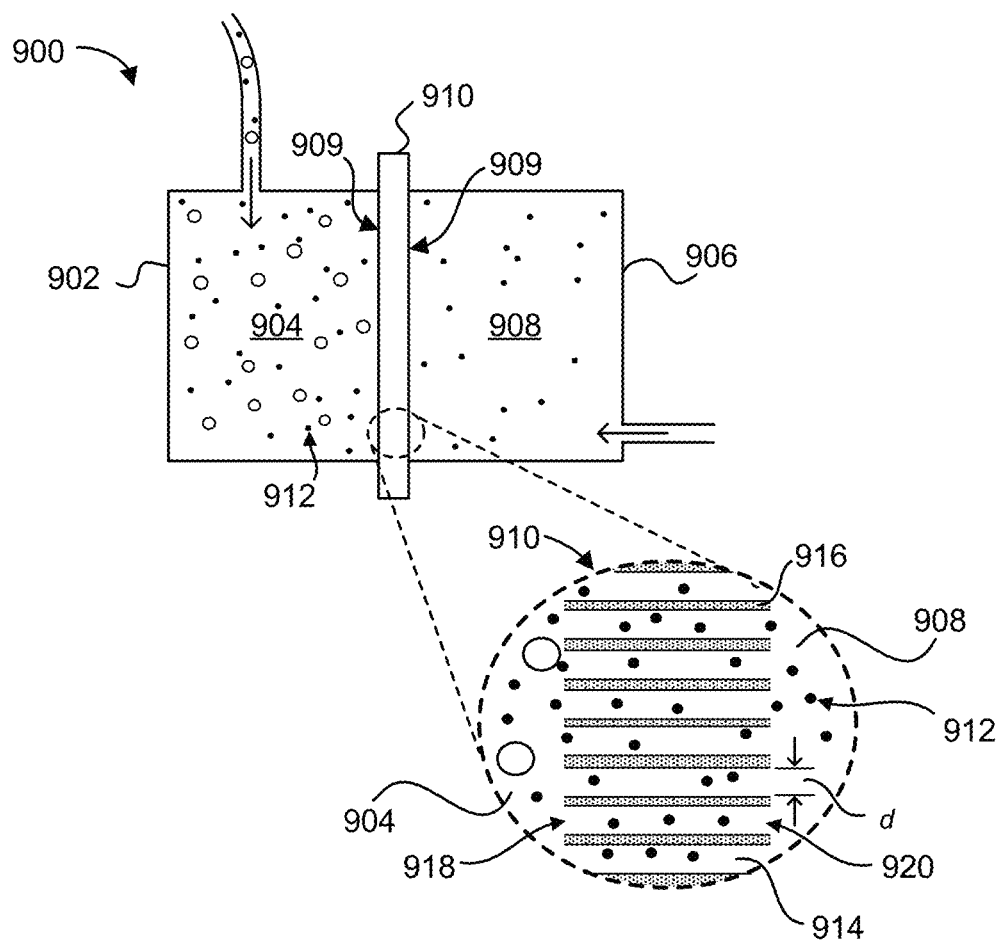

FIG. 9 depicts a product 900 for concentration-gradient-driven separation, in accordance with one embodiment. As an option, the present product 900 may be implemented in conjunction with features from any other embodiment listed herein, such as those described with reference to the other FIGS. Of course, however, such product 900 and others presented herein may be used in various applications and/or in permutations which may or may not be specifically described in the illustrative embodiments listed herein. Further, the product 900 presented herein may be used in any desired environment.

According to one embodiment, a product is a solution-diffusion apparatus. A product 900 for concentration-driven separation includes a first chamber 902 configured to receive a feed (bulk) fluid 904, a second chamber 906 configured to receive a permeate fluid 908, and a nanoporous membrane 910 between the first and second chambers 902, 906 for transporting a component 912 from the feed fluid 904 under a concentration gradient. The nanoporous membrane 910 includes a plurality of CNTs 914 having substantially parallel longitudinal axes, and a fill material 916 in interstitial spaces between the CNTs 914 for preventing fluidic transfer between opposite sides of the nanoporous membrane 910 except through interiors of the CNTs 914.

Preferably, the feed fluid 904 and the permeate fluid 908 are in chemical equilibrium with the surfaces 909 of the nanoporous membrane 910.

The component 912 preferably has an average diameter smaller than the average inner diameter d of the CNTs 914. In one approach, the component includes ions having an average diameter smaller than an average inner diameter of the CNTs. In another approach, the component includes molecules having an average diameter smaller than the average inner diameter of the CNTs.

As described herein, the CNTs 914 of the nanoporous membrane 910 have an average inner diameter d of about 10 nm or less, both ends 918, 920 of at least some of the CNTs 914 are open, the fill material is impermeable, etc. In one approach, the CNTs of the nanoporous membrane have an inner diameter of about 6 nm or less.

In some approaches, greater than 2% to less than 100% of the CNTs have both ends open. In a preferred approach, less than 95% of the CNTs have both ends open. In one approach, essentially all (up to 100%) the CNTs have both ends open.

In one approach, the product may be used in a dialysis apparatus. The product may be used in hemodialysis. The feed fluid may be blood. The component may be waste products that include small molecules and/or ions to be removed from the blood. The permeate may be a dialysis solution.

In an illustrative approach where the product is configured to perform kidney dialysis, for example, the nanoporous membrane may be characterized by exhibiting a rate of diffusion of the component from the blood through the nanoporous membrane, under a concentration gradient in the absence of a pressure gradient and a voltage gradient that is higher than, and preferably greater one times (1×) a bulk diffusivity of the component in the blood. The component from the blood may include ions having an average diameter smaller than an average inner diameter of the CNTs of the nanoporous membrane. The component from the blood may include molecules having an average diameter smaller than the average inner diameter of the CNTs.

The rate of diffusion of the component through the nanoporous membrane may be maintainable at or above 1× the bulk diffusivity of the component. In one approach, the rate of diffusion of the component through the nanoporous membrane may be maintainable greater than 2× the bulk diffusivity of the component. In another approach, the rate of diffusion of the component through the nanoporous membrane may be maintainable above at least one order of magnitude (10×) of the bulk diffusivity of the component. In yet another approach, the rate of diffusion of the component through the nanoporous membrane may be maintainable above at least 20× the bulk diffusivity of the component. In some approaches, the rate of diffusion of the component through the nanoporous membrane may be maintainable up to 40× the bulk diffusivity of the component. The rate of diffusion of a component may be defined as the transport of a component across a nanoporous membrane, not including transport across any boundary layers present.

In some approaches, the product may be configured to not apply a pressure gradient to the chambers and to not apply a voltage gradient to the chambers.

Figure 10:
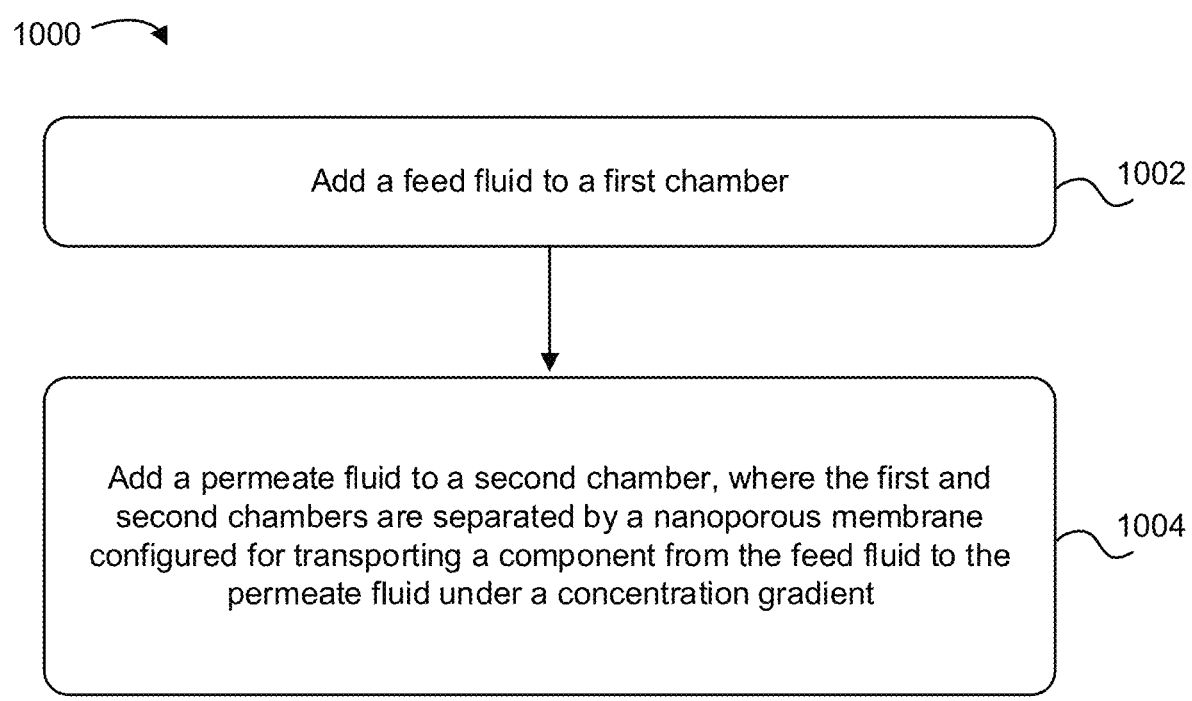

FIG. 10 shows a method 1000 for separating a component by diffusion from a feed fluid, in accordance with one embodiment. As an option, the present method 1000 may be implemented to devices such as those shown in the other FIGS. described herein. Of course, however, this method 1000 and others presented herein may be used to provide applications which may or may not be related to the illustrative embodiments listed herein. Further, the methods presented herein may be carried out in any desired environment. Moreover, more or less operations than those shown in FIG. 10 may be included in method 1000, according to various embodiments. It should also be noted that any of the aforementioned features may be used in any of the embodiments described in accordance with the various methods.

Operation 1002 of method 100 includes adding a feed fluid (bulk fluid) to a first chamber. The feed fluid includes a component to be separated from the feed fluid via diffusion across a nanoporous membrane.

Operation 1004 of method 100 includes adding a permeate fluid to a second chamber. The first and second chambers are separated by a nanoporous membrane configured for transporting the component from the feed fluid to the permeate fluid under a concentration gradient. The nanoporous membrane includes a plurality of carbon nanotubes having substantially parallel longitudinal axes, and a fill material in interstitial spaces between the carbon nanotubes for preventing fluidic transfer between opposite sides of the nanoporous membrane except through interiors of the carbon nanotubes. The fill material is impermeable.

In one approach, an average inner diameter of the carbon nanotubes is about 10 nanometers or less, where both ends of at least some of the carbon nanotubes are open. The method 1000 may employ a nanoporous membrane with less than 95% of the CNTs being open at both ends, but in preferred approaches, about 100% of the CNTs have both ends open.

The component may be one of the following: ions having an average diameter smaller than an average inner diameter of the carbon nanotubes, molecules having an average diameter smaller than the average inner diameter of the carbon nanotubes, or both.

The method 1000 may be a method for kidney dialysis. In accordance with such method, the feed fluid is blood. The component includes waste products in the form of small molecules and/or ions.

The method 1000 may be conducted without application of a pressure gradient to the chambers or without application of a voltage gradient to the chambers. Preferably, this aspect of the method 1000 includes a rate of diffusion of the component from the feed fluid through the nanoporous membrane, under a concentration gradient in the absence of a pressure gradient and a voltage gradient, that is higher than, and preferably at greater than one times (1×) a bulk diffusivity of the component in the feed fluid. In one approach, the rate of diffusion of a component through the nanoporous membrane may be greater than 2× the bulk diffusivity of the component. In one approach, the rate of diffusion of the component through the nanoporous membrane remains at or above at least one order of magnitude (10×) greater than the bulk diffusivity of the component in the feed fluid. In one approach, the rate of diffusion of the component through the nanoporous membrane remains greater than 20× the bulk diffusivity of the component. In yet another approach, the rate of diffusion of the component through the nanoporous membrane remains up to 40× the bulk diffusivity of the component. The rate of diffusion of a component may be defined as the transport of a component across a nanoporous membrane, not including transport across any boundary layers present.

The occurrence and magnitude of transport enhancement in the CNT channels of the nanoporous membrane is supported by an absence of defects in the membrane. For example, during diffusion studies, the stable plateau of $N_2$ permeance at 100% open pores indicates lack of formation of defects during the etching step of the fabrication process. The nanoporous membrane demonstrates an efficient rejection of large molecules, for example, greater than 99% rejection of dye molecules (3×1×1.5 nm) and gold nanoparticles (5 nm), which also supports the absence of defects larger than a few nanometers. In nanoporous membranes in which the CNT channels have been intentionally blocked, no transport of ions/small molecules occurs through the membrane, thereby indicating that there are no transport pathways of any size (defects) in the matrix filling the spaces in-between the nanotubes. Therefore, all measured transport in the nanoporous membranes described here occurs through the CNT channels. Moreover, nanoscale defects are preferably not present in the nanoporous membrane because they typically decrease the membrane selectivity.

Figures 11A, 11B, 11C:
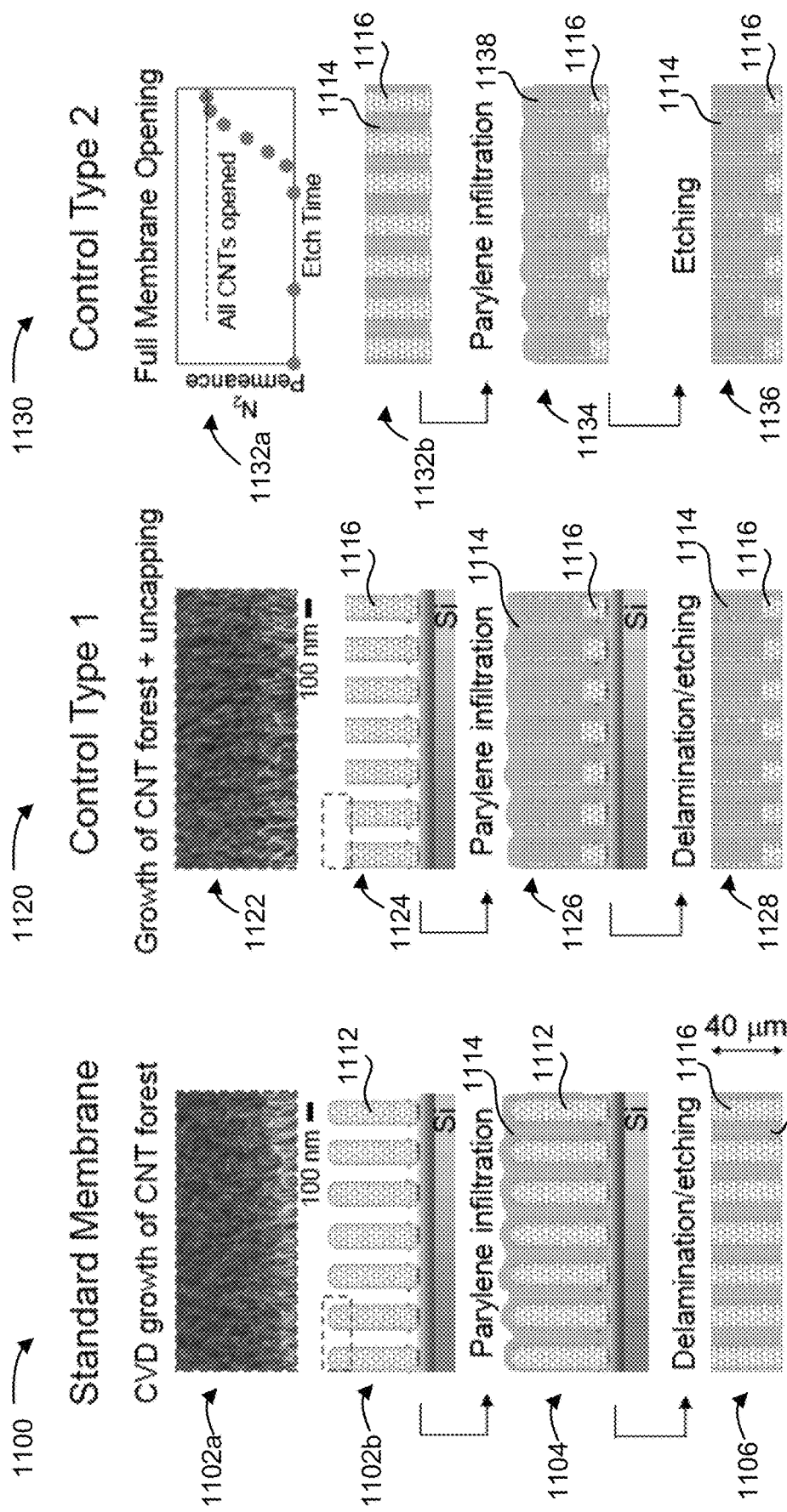

Control testing of the nanoporous membrane described herein in which the CNT, VA-SWCNT, etc. channels are intentionally clogged to prevent transport confirms that transport of ions and small molecules is restricted to the VA-SWCNT channels of the nanoporous membrane. FIGS. 11A-11C depict schematic pathways of fabrication of nanoporous membranes compared to control membranes. FIG. 11A depicts the standard pathway 1100 of forming a nanoporous membrane, starting with a CVD growth of the CNT forest 1102a, 1102b, in which CNTs 1112 are grown on a silicon substrate. The schematic drawing of the CNT forest 1102b illustrates with a dashed rectangle box the region of the CNT forest shown in the image of the CNT forest 1102a. The following step 1104 includes matrix infiltration 1114 between and above the CNTs 1112. The next step 1106 includes delamination and etching to remove the caps of the CNTs resulting in open CNTs 1116.

FIG. 11B depicts a pathway 1120 for fabrication of the Control Type 1 membrane. The first step 1122 includes growing the CNT forest as depicted in the image, similar to the standard pathway 1100. However, the next step 1124 includes etching to remove the caps of the CNTs to form open CNTs 1116, then the following step 1126 includes matrix infiltration 1114 between the open CNTs 1116 and inside the open CNTs 1116. The next step 1128 includes delamination and etching under similar conditions as step 1106 of the standard pathway 1100.

FIG. 11C depicts a pathway 1130 for fabrication of the Control Type 2 membrane. The first step 1132b includes the combined steps growth of CNT forest 1102b through 1106 of standard pathway 1100 with etching to achieve 100% open CNTs as shown in the plot 1132a of etch time vs $N_2$ permeance. The starting membrane of pathway 1130 as shown in step 1132b includes open CNTs 1116 with matrix infiltration 1114 between the CNTs. The next step 1134 includes an additional matrix infiltration 1138 for filling the open CNTs 1116 and additionally to cover the region on top of the CNTs. The next step 1136 includes a second step of etching under similar conditions as step 1106 of the standard pathway 1100.

Fabrication of Control Membrane 1 and Control Membrane 2 provides rigorous control analysis to demonstrate that the membrane fabrication process does not create defect pathways for small molecule/ion transport through the matrix of the membrane. In contrast to conventional tests adopted for CNT membranes in the literature, control testing provides affirmative demonstration that possible defect pathways having average diameters at or below the size of the transporting CNT pores do not exist in the membranes described herein.

In some approaches, the number of transporting CNTs of the nanoporous membrane may be fine-tuned and accurately characterized to quantify the boundary layer resistance at the membrane surface. As described herein, new separation technologies having high permeance may be achieved without making sacrifices to selectivity, membrane thickness, etc.

Experiments

Fabrication of CNT Membranes

Briefly, 20-30 µm tall vertically aligned CNT forests were synthesized from a 5.5/0.5 Å Fe/Mo catalyst layer on a silicon (100) wafer using atmospheric-pressure chemical vapor deposition with ethylene as the carbon source. CNT interstitial spaces were then filled with parylene-N via conformal coating from the vapor phase under vacuum and at room temperature. The CNT-parylene composite films were released from the silicon wafer by soaking in a 37 wt % aqueous HCl solution overnight and then mounted on a polyimide plastic film with a punched hole of 1.5 cm diameter. To remove the excess parylene-N covering the CNT tips and open the CNTs to fluid flow, reactive ion etching was used followed by a milder air-plasma treatment.

Density of CNT Forests with and without Parylene Infiltration

Various methods may be performed to determine the density of the CNTs 302 in the forest 301 as formed in step 202 (FIG. 2, FIG. 3A). The weight gain method following conventional techniques measures a mean density calculated from a volumetric mass density of the CNTs, the height of the forest measured by SEM, and the silicon support area under the forest. Synchrotron X-ray attenuation measures the mass density of the CNT forest by measuring the X-ray intensity of scattering upstream and downstream of the sample, and then using these values to calculate the CNT forest mass density based on the Beer-Lampert law following conventional techniques. Using these two methods, the CNT forest density has been calculated to be $5.2 \times 10^{11}$ CNT/cm for weight gain, and $5.1 \times 10^{11}$ CNT/cm for X-ray attenuation.

A third method, KCl diffusion, measures the density of open CNT pores after parylene infiltration and membrane surface etching. In these KCl diffusion studies, the CNT forest density was calculated to be $6.5 \times 10^{11}$ CNT/cm², which compares closely with the density measurement using the weight gain method and the synchrotron X-ray attenuation measurements. All three density values correspond to a porosity of 4.4% to 5.5%.

Transport Across CNT Membranes

Figure 5A:
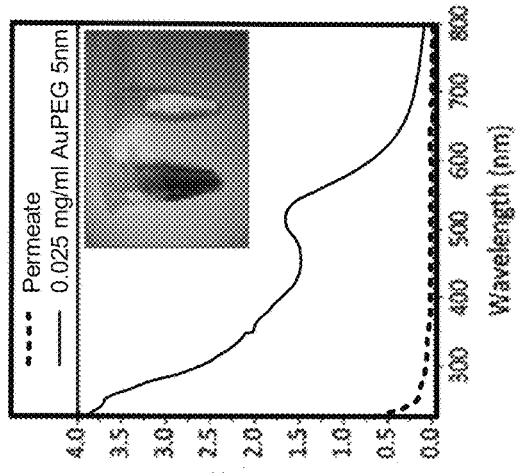
FIG. 5A is UV-vis spectra (plot) and optical images (inset) of $K_3FeCN_6$ feed and permeate solutions after filtration through a CNT membrane.
Figure 5B:
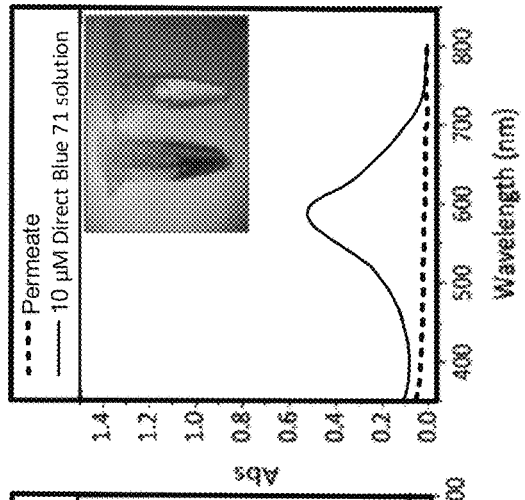
FIG. 5B is UV-vis spectra (plot) and optical images (inset) of Direct Blue 71 dye feed and permeate solutions after filtration through a CNT membrane.
Figure 5C:
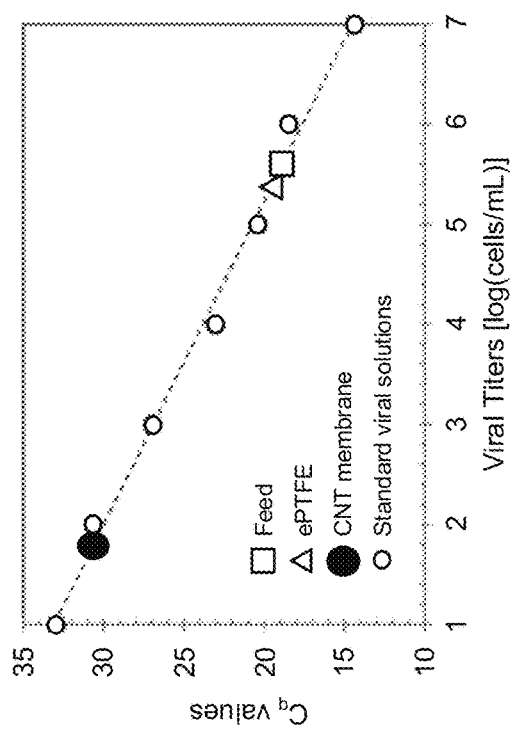
FIG. 5C is UV-vis spectra (plot) and optical images (inset) of nAu5 gold nanoparticle feed and permeate solutions after filtration through a CNT membrane.

The CNT membranes were challenged to filter out a series of molecules having different sizes and charges in order to demonstrate transport across the membranes occurs through the CNT pores. FIGS. 5A-5C show three different sized and charged molecules tested to transport through the CNT membranes: FIG. 5A shows potassium ferricyanide ($[Fe(CN)_6]^{3-}$ anion, size about 0.95 nm), FIG. 5B shows a larger negatively charged dye (Direct Blue 71, size $3 \times 1.5 \times 1$ nm³), and FIG. 5C shows a neutral polyethylene glycol (PEG)-coated Au nanoparticles ("nAu5," size 5 nm). Ultraviolet-visible (UV-vis) spectroscopy shows a reduction in $[Fe(CN)_6]^{3-}$ concentration by about 55% in the permeated solution (dotted line, FIG. 5A), and the slight changes are observed in the inset showing the left tube with $[Fe(CN)_6]^{3-}$ feed solution and the right tube with permeate solution.

The negatively charged molecules (Direct Blue 71, FIG. 5B) and the larger particles of PEG coated Au (FIG. 5C) each show an absence of detectable peaks in the permeate UV-vis spectra (dotted lines on the plots), and permeates in the tubes (right tubes in the insets) do not contain the color of the feed solutions (left tubes in inset). Thus, there appeared to be a complete rejection of feed solutions during filtration through the CNT membranes as shown in FIGS. 5B and 5C.

Overall, there appeared to be both steric and electrostatic effects that contributed to the membrane selectivity. Since the diameters of the CNT pores are significantly wider than the molecular size of $[Fe(CN)_6]^{3-}$, the partial rejection of the molecules seemed to be attributed to electrostatic interactions between the negatively charged carboxylic groups at the tube entrance and the anions in solution. Similarly, even though the dimensions of the Direct Blue 71 molecule fall within the CNT diameter distribution, complete dye exclusion may have been achieved because of the contribution of the electrostatic interactions. Finally, since nAu5 does not carry a charge, its rejection may be due exclusively to steric effects, i.e. size exclusion. All of these filtration results suggest that transport occurs through the CNT pores. Moreover, the exclusion of uncharged species with sizes just above the upper bound of the CNT diameter distribution suggests that garments incorporating these membranes may protect against viruses and bacteria by size exclusion.

Figure 5D:
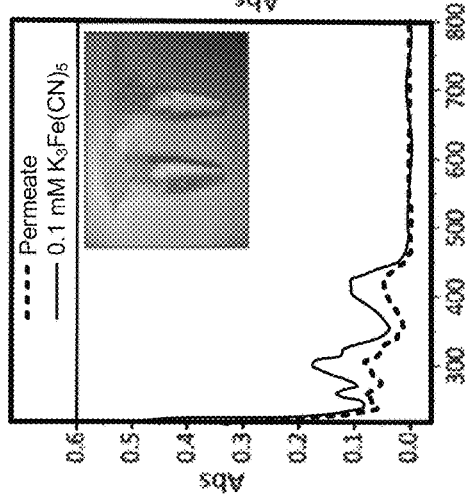
FIG. 5D includes scanning electron micrograph images (left) of a CNT membrane and an ePTFE membrane after filtration of Dengue virus solution, optical images (middle and right) of culture plates from plaque assay analysis of feed viral solution and permeate.
Figure 5E:
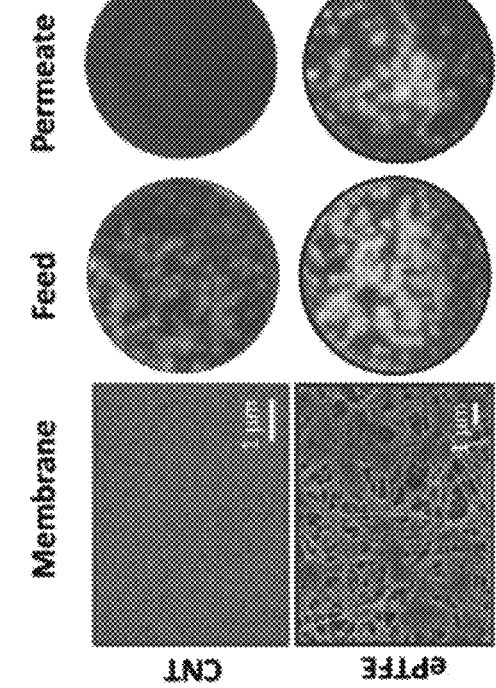
FIG. 5E is a plot of the qRT-PCR analysis of filtration of Dengue virus solution through CNT membrane and ePTFE membrane.

FIGS. 5D and 5E show CNT membranes can block biological threats. In FIG. 5D, an aqueous solution of about 40 to 60 nm Dengue virus was filtered through a CNT membrane. Both quantitative polymerase chain reaction (qRT-PCR) and the plaque assay were employed to test the penetration of viral particles across the membrane to the permeate side. The plaque assay (FIG. 5D) revealed that CNT membrane permeate was free of infectious virus as indicated by the absence of plaque (white particles) in the culture dish of the optical image (top right circle). The qRT-PCR measurements (FIG. 5E) confirmed these findings by showing a four-log decrease in viral RNA concentration on the permeate side after filtration, <2 log(cells/mL) (CNT membrane) compared to the levels in the beginning solution, nearly 6 log(cells/mL) (Feed).

In sharp contrast, when the virus filtration challenge was repeated for a reference macroporous membrane made of highly breathable expanded polytetrafluoroethylene (ePTFE), Dengue virus penetrated freely through the membrane as shown in FIG. 5D, bottom row, with viral plaques (white particles) in both the feed and permeate and in FIG. 5E with viral titres of ePTFE (solid triangle) at levels similar to the feed, approximately 5-6 log(cells/mL). Thus, the ePTFE membrane provides little protection from biological hazards due to its open macroporous structure.

Vapor Transport Across CNT Membranes

To allow efficient evaporative cooling of the body through perspiration, a protective ensemble must provide a moisture vapor transport rate (MVTR) greater than 1500 to 2000 g/m²day. For CNT membranes, breathability was measured with the dynamic moisture permeation cell (DMPC) method, in which purely diffusive steady-state transport of water vapor was established by exposing each membrane side to a gas stream with a different relative humidity (RH). From experimental MVTR and the average water-vapor concentration difference across the membrane $\Delta C$, the corresponding total resistance to moisture vapor transport was calculated, $R_{tot}=\Delta C/MVTR$.

Figure 6:
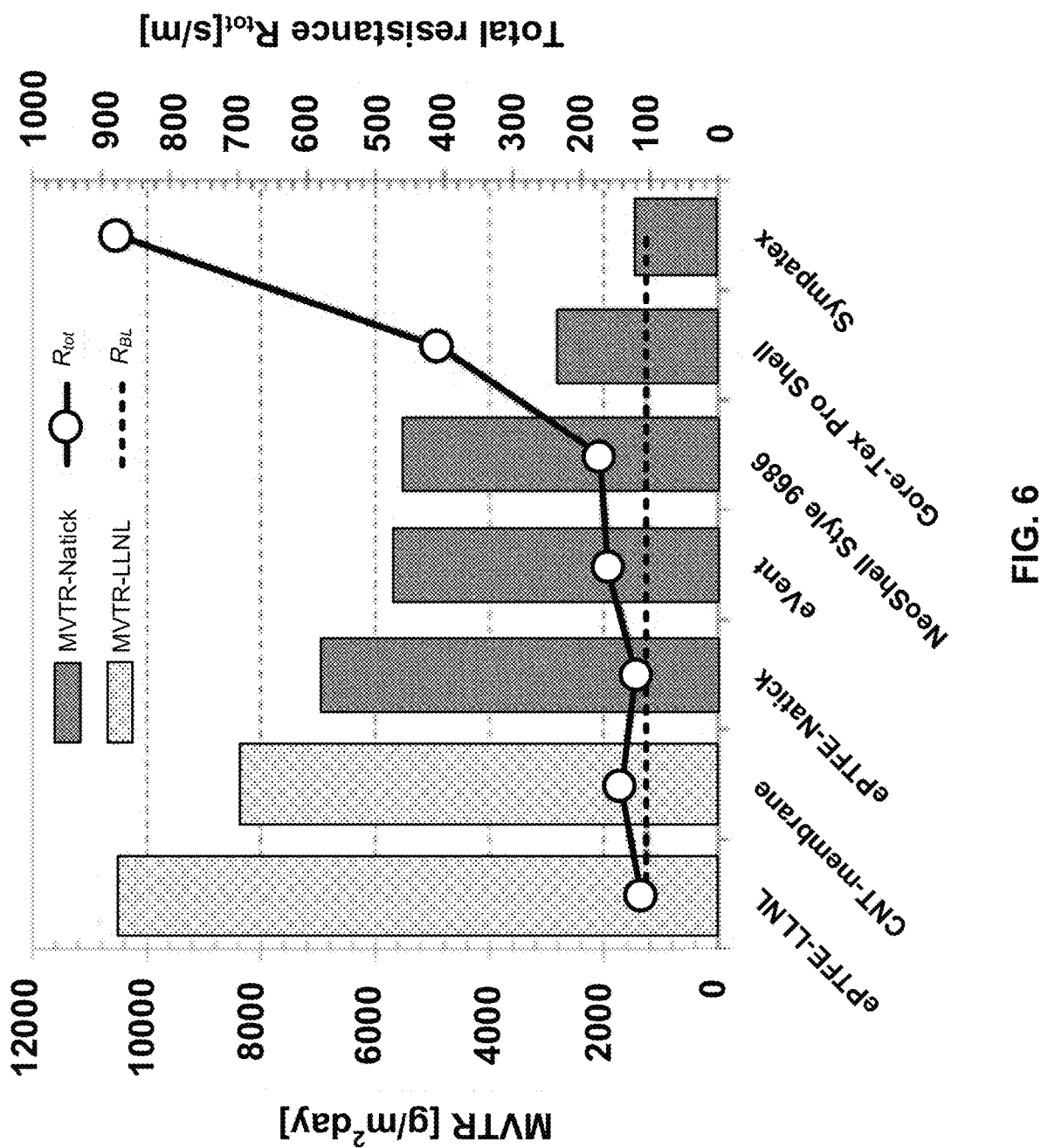
FIG. 6 is a bar graph depicting MVTR and corresponding $R_{tot}$ of CNT membranes and commercial breathable fabrics.

In FIG. 6, the measurements of MVTR (bars, left y-axis) and $R_{tot}$ (open circles, right y-axis) for CNT membranes and commercial breathable fabrics are compared, including macroporous films (ePTFE, eVent, NoeShell) or dense polymer laminates (Gore-Tex, Pro Shell, Sympatex). All samples were measured at 30° C. and at a mean RH=30% for an incoming gas stream humidity difference $\Delta RH=50\%$. Data for CNT membranes and ePTFE films were collected with 1-2 cm² area samples, while the data of the remaining fabrics were measured with 25 cm² area samples. Because of the intrinsically different transmembrane $\Delta C$ stemming from the difference in active membrane area, results are best compared in terms of $R_{tot}$. The black dashed line represents the boundary layer resistance $R_{BL}$.

At these conditions, the $R_{tot}$ for CNT membrane (resistance to water vapor transport) was comparable or smaller than $R_{tot}$ for conventional breathable fabrics (open circles graph of FIG. 6).

In particular, looking at the bar graph of FIG. 6, CNT membranes provided MVTR close to 8000 g/m²day, i.e., fourfold larger than the breathability target. Notably this transport rate approaches that of macroporous ePTFE in spite of the much smaller porosity (<5.5% vs about 64%) and average pore size (3.3 nm vs about 210 nm).

Single Pore Water Vapor Permeability

The DMPC method measures the total resistance to water vapor diffusion ($R_{tot}$), including the contribution of resistances ($R_{BL}$) due to the air-side boundary layer at the two membrane surfaces. To benchmark the performance of CNT pores against various porous materials, the intrinsic mass transport properties of the CNT membranes ($R_{CNT}$) was obtained by accounting for $R_{BL}$ which is membrane-independent and was obtained from the y-intercept in a linear plot of $R_{tot}$ versus membrane thickness. In this case, the $R_{BL}$ was obtained using ePTFE membranes by stacking a different number (1, 5, 10, and 15) of identical layers, each about 18 μm thick. Application of a resistance-in-series model allowed extracting the magnitude of all resistances ($R_{BL}=104.5$ s/m, $R_{ePTFE}=5$ s/m, and $R_{CNT}=38.5$ s/m) and revealed a large contribution of the external air-side resistance to the total measured breathability.

Figure 7:
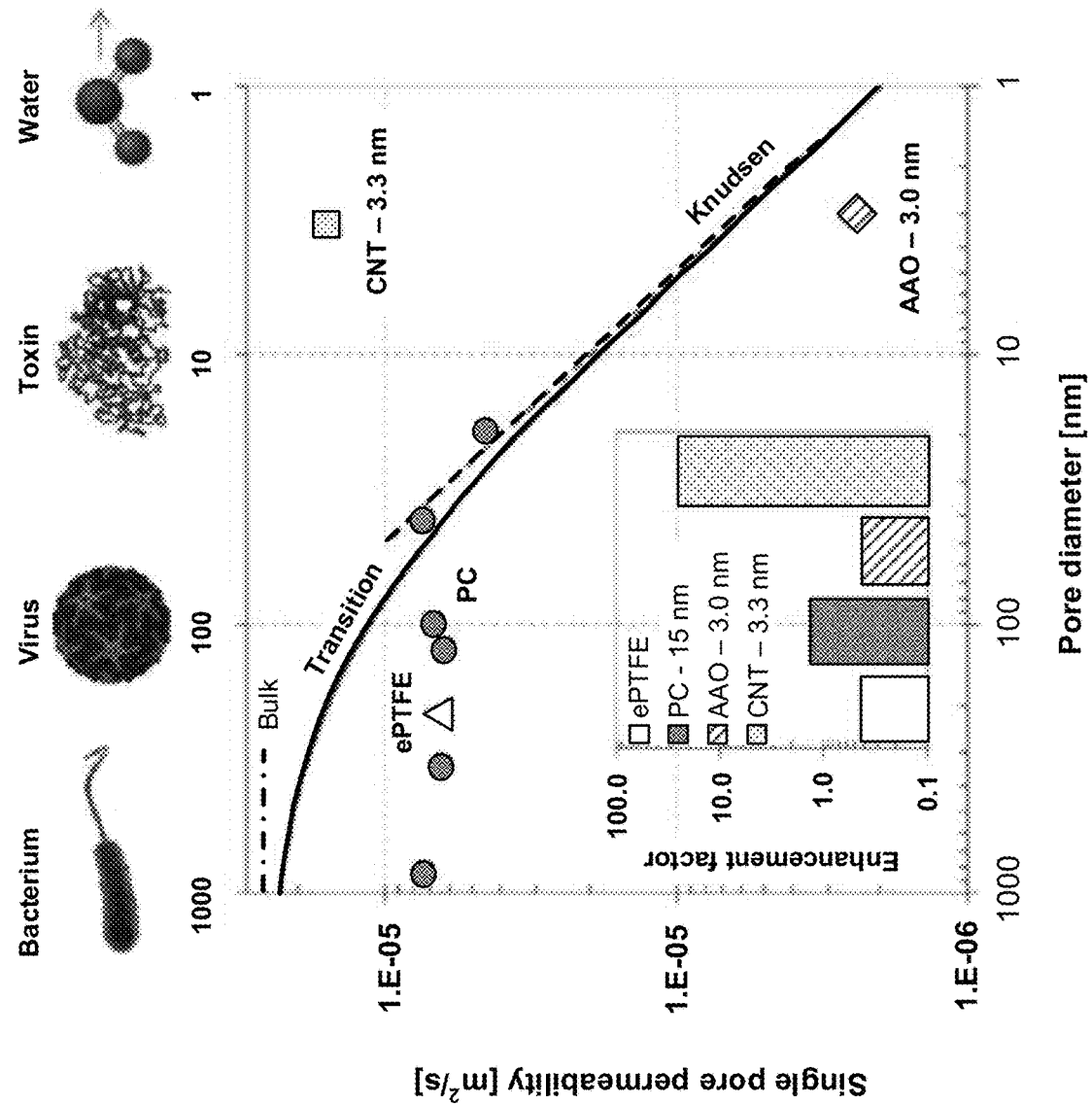
FIG. 7 is a plot of single-pore water vapor permeability of a CNT membrane and several porous membranes. Inset is a bar graph of the enhancement factor defined as a ratio of measured to predicted permeability of CNT membrane and several porous membranes.

FIG. 7 shows a breathability/protection quality plot for porous materials using the knowledge of the intrinsic membrane properties for water vapor transport. The plot represents the water vapor permeability of a single pore as a function of its diameter. As shown in the plot, for the small pores, the predicted transport rate using the Knudsen diffusion equation is shown by the dashed line. For intermediate pores, the predicted transport rate using the transition regime diffusivity equation is shown by the solid line. For large pores, the predicted transport rate using the bulk diffusion equation is shown by the dotted-dashed line.

The single pore permeability for several porous membranes (polycarbonate, PC=circle, ePTFE=triangle, anodic aluminum oxide, AAO=diamond, CNT, CNT=square) were obtained with the DMPC method at 30° C. with average RH=30% and an incoming gas stream humidity difference of 50%. The inset of FIG. 7 shows the enhancement factor defined as ratio of measured to predicted permeability. On the upper x-axis of the plot are the typical dimensions, in nm, of biological threats.

FIG. 7 shows that these gas diffusion theories predict with good accuracy (within a factor of 3) the magnitude of the transport rates for conventional membranes (the points are close to the predicted lines), whereas the permeability of the CNT channels is 24 times larger than Knudsen diffusion predictions (dashed line) and comparable to bulk diffusivities (dotted-dashed line)(about 0.16 cm²/s in the CNTs vs 0.26 cm²/s in the bulk).

Without wishing to be bound by any theory, the inventors believe this plot shows enhanced gas-transport in CNTs driven by a concentration gradient. Molecular dynamics (MD) simulations predicted diffusivities approaching bulk diffusion for pure gases like $H_2$, $CH_4$, Ne, Ar, $N_2$, and $CO_2$ inside a CNT and also showed that the Fickian diffusivities in a $CH_4/H_2$ gas mixture transporting through a CNT are close to that of their pure-component counterparts. This enhancement may be explained with the intrinsic atomic smoothness of well-graphitized CNT walls.

More specifically, in the Knudsen regime, molecule-surface collisions dominate over molecule-molecule collisions and dictate the magnitude of gas transport. Knudsen diffusion assumes diffusive scattering after a molecule-wall collision. However, if the inner surface of a pore instead of being rough (such as in a typical ceramic or polymeric membrane) is atomically smooth (such as in a CNT), the nature of the gas-wall collisions shifts from purely diffusive to a combination of diffusive and specular collisions. In addition, for a pore with a very smooth potential energy surface such as a CNT, the energy required to move an adsorbed gas molecule along the pore wall is very small. Thus, gas diffusivities in CNTs are much larger than estimated by Knudsen diffusion and found in other nanoporous materials with comparable pore dimensions.

CNTs may have an enhancement of water vapor transport over Knudsen theory with a magnitude approaching that measured for pure gasses under a pressure gradient. To confirm this expectation, the mass transport rate of nitrogen was quantified in the SWNTs under a pressure gradient. The about 23 μm thick CNT-composite membranes were measured to have a nitrogen permeance of $1.81\pm0.36\times10^{-5}$ mol/m²sPa, which was about 50 times larger than predictions based on Knudsen diffusion theory. Thus, without wishing to be bound by any theory, the inventors believe that the high breathability of the CNT membranes may be attributed to the smoothness of the SWNT pores.

Liquid Flow Transport Rates

The water permeability of CNT membranes was quantified under hydraulic pressure gradient. For dilute aqueous solutions, a liquid permeance of $42.5\pm17.3$ L/m²hbar was found based on total membrane area which corresponded to an enhancement factor of $214\pm93$ with respect to the Hagen-Poiseuille equation. In addition to demonstrating fast flow, this enhancement factor suggested that transport measured across the CNT membranes may occur through the CNT pores rather than through nm sized gaps in the polymer matrix.

Measuring Diffusion Rates

Figure 12:
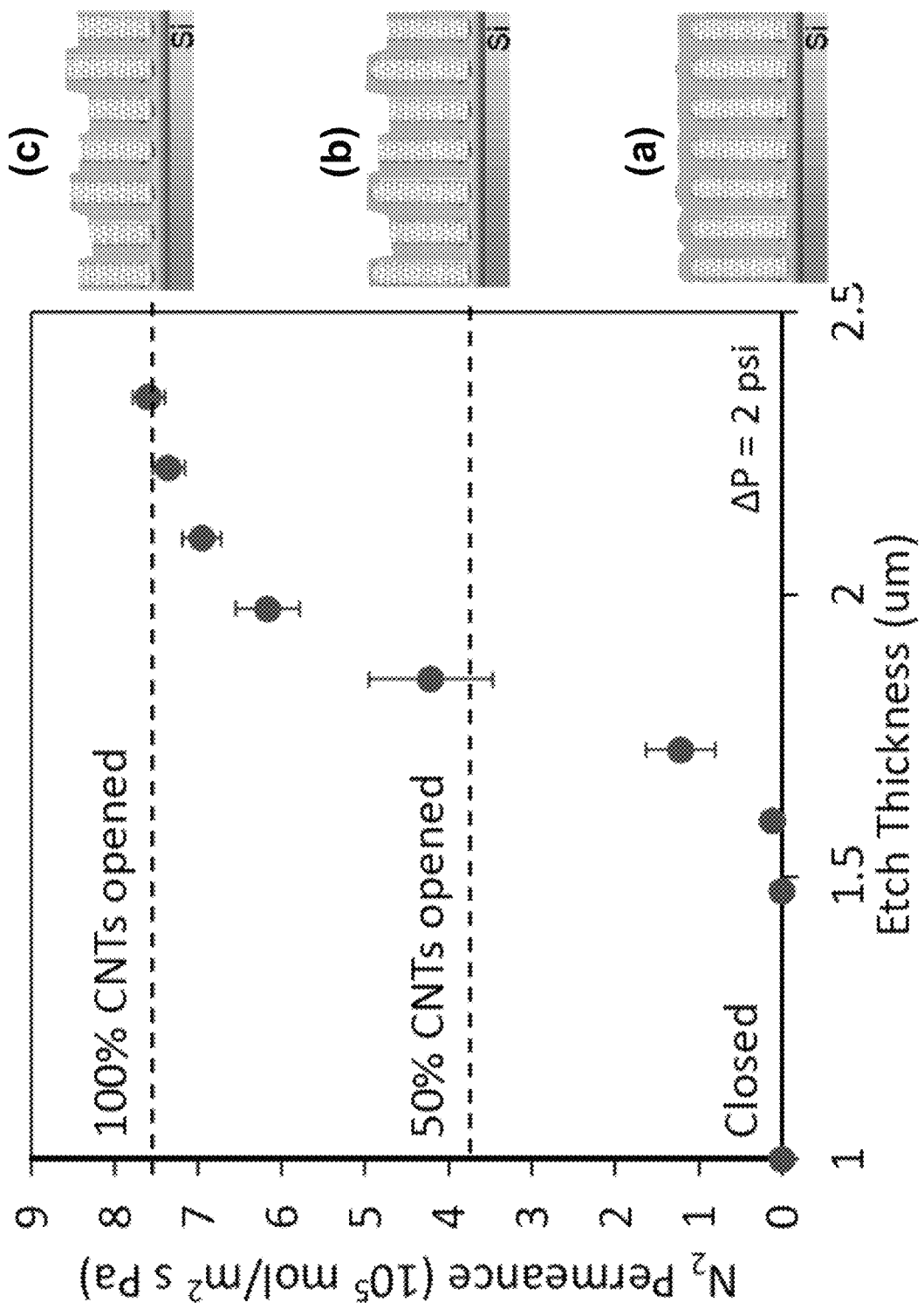

FIG. 12 depicts a plot of pressure-driven $N_2$ gas diffusion rates of a CNT membrane (y-axis) following different stages of etching with oxygen plasma, as measured by etch thickness (x-axis). The schematic drawings to the right of the plot illustrate an extent of open CNT channels in the membrane corresponding to etch thickness. The bottom schematic drawing shows all CNT pores closed and the diffusion rates of a membrane having closed CNTs demonstrate zero $N_2$ permeance, thus showing essentially none of the $N_2$ is transported across the membrane. The middle schematic drawing illustrates a portion of the CNT pores open with increased etch thickness (approximately 1.75 μm) and about a middle range of $N_2$ permeance. The upper schematic drawing illustrates all of the CNT pores open and the $N_2$ permeance level has plateaued at around $7.5 \times 10^{-5}$ mol/m$^2$sPa. A known number of transporting CNTs, i.e. CNTs capable of transporting ions and small molecules in a membrane is determined from a plot of diffusion rates corresponding to increase etch thickness.

Concentration gradient-driven diffusion rates through a CNT membrane are characterized using a device that records conductivity, volume, and temperature over time. The device for characterizing diffusion in a CNT membrane includes two chambers separated by the membrane and containing the solutions with different solute concentration, a conductivity probe, a capillary port, a water jacket, and a magnetic stirrer in both chambers to maintain a uniform solute concentration during a diffusion experiment.

The diffusion experiments were conducted at pH 3 to neutralize the charges at the CNT entrance and remove the electrostatic interactions between the CNT and the ion, which may affect measured diffusion rate by (partially) excluding ions from the interior of the CNT pores.

Boundary Layer Resistance

Figure 13A:
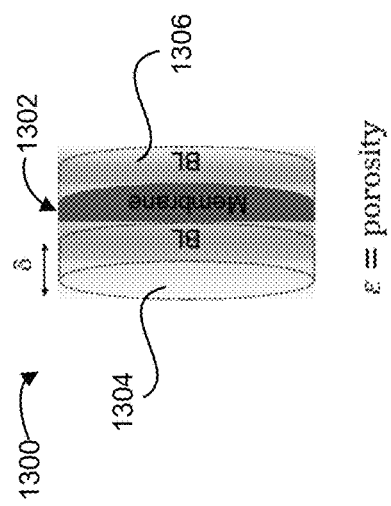

Boundary Layer Resistance may be quantified by the following calculations. As shown in the system 1300 of FIG. 13A, a membrane 1302 has boundary layers 1304, 1306 on either side of the membrane. The boundary layer resistance dominates with a membrane having fully opened CNT channels. According to Equation 1 and 2, $$EF = \frac{D_{membrane} K_p}{D_{bulk}} \qquad \text{Equation 1}$$

$$EF^* = \frac{F_{measured}}{F_{bulk}} \qquad \text{Equation 2}$$

Then, 1/EF* is calculated according to Equation 3, $$\frac{1}{EF^*} = \frac{1}{EF} + \varepsilon \frac{2\delta}{L_{membrane}} \qquad \text{Equation 3}$$

where EF is enhancement factor, D is a diffusion coefficient (i.e., diffusivity), F is an ion or salt flux, ε is porosity, δ is thickness of the boundary layer 1304, 1306 and $K_p$ is a partition coefficient. A plot as depicted in FIG. 13B shows one divided by the measured transport rate enhancement factor (1/EF*) of LiCl for a CNT membrane having portions of the CNTs open. The slope of the values of 1/EF* per % CNTs open determines the boundary layer resistance $R_{BL}$ for the diffusion of LiCl through a CNT membrane.

Figure 13C:
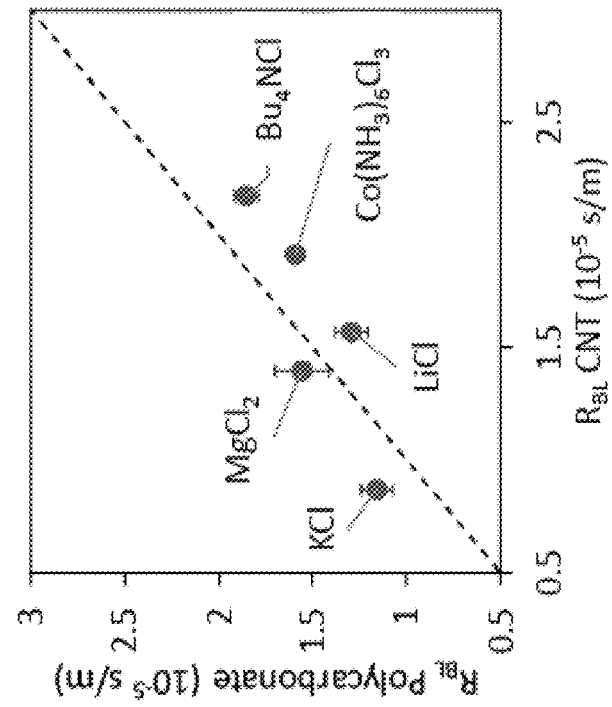
Figure 13B:
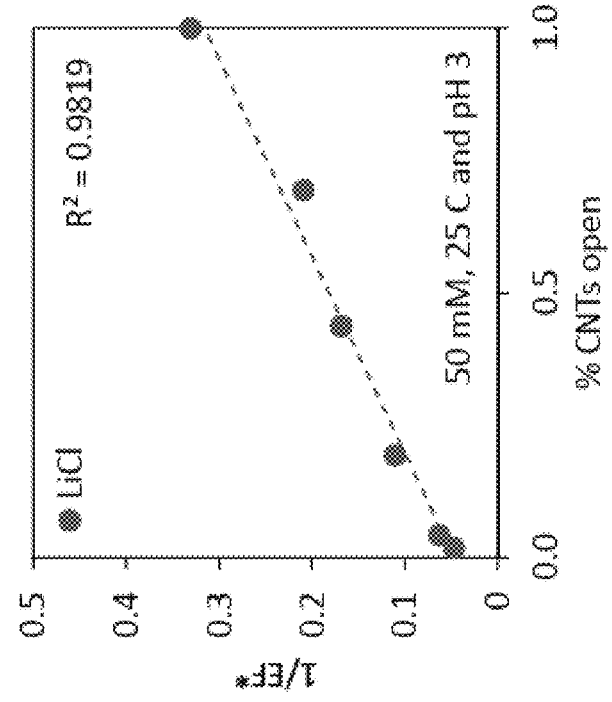

As shown in FIG. 13C, a graph depicts a comparison of values of the boundary layer resistance $R_{BL}$ of track etched polycarbonate membranes compared to the boundary layer resistance $R_{BL}$ of CNT membrane for multiple salts, such as KCl, MgCl$_2$, LiCl, Bu$_4$NCl, and Co(NH$_3$)$_6$Cl$_3$.

As shown in FIG. 14A, the EF values of various salts through polycarbonate membranes are close to 1.0 (dashed line) showing no enhanced transport. This is expected because the pore sizes (30 to 400 nm) of these membranes are large enough to minimize hindered diffusion effects. The commercially available polycarbonate membranes have pores that do not display the structure, properties, etc. of the CNT pores of the nanoporous membrane described herein. Therefore, at (smaller) pore sizes commensurate with the permeating solute diameters, the transport rates through commercially available polycarbonate membranes are known to follow hindered diffusion.

As shown in FIG. 14B, a comparison between the EF values of nanoporous CNT membrane for different salts obtained from an extrapolation procedure or directly with a membrane having 1.9% open CNT channels shows that the contribution of $R_{BL}$ to the total diffusion resistance for each salt was negligible with 1.9% open CNT channels.

Enhanced Diffusion Compared with Energy Cost

FIG. 15 depicts a plot of the enhancement factor (EF, y-axis) for diffusion of different salt through a CNT membrane versus Total Energy (x-axis) that represents the free energy of small molecule/salt transport from bulk water to the confined interior of a CNT pore in the nanoporous membrane. The plot includes data for salts having ions (e.g., cations and anions) of different diameters and charge. The energy cost includes the energy needed to confine a neutral hard sphere in a narrow cylinder and the electrostatic energy to transition ions from bulk water to a solution of reduced dielectric constant. The fit (dashed line) suggests indeed a slightly lower dielectric constant of water inside the CNT.

Control Membranes

Control membranes were fabricated to determine whether defects in the matrix of the nanoporous membrane could account for the enhanced diffusion of ions/small molecules as described in FIGS. 11A-11C. FIG. 16A is a plot of pressure-driven transport rates of $N_2$ for each of the membranes fabricated in FIGS. 11A-11C. As shown, with increasing etch thickness, only the nanoporous membrane fabricated by the standard pathway displays detectable gas transport and follows a curve of increased $N_2$ permeance that eventually plateaus once all CNT pores are opened. The Control 1 Membrane and the Control 2 Membrane displayed zero $N_2$ permeance with increased etch thickness, thereby demonstrating that transport of $N_2$ is unambiguously through CNTs and there are no defect pathways of any size through the matrix material of the membrane.

Figure 16B:
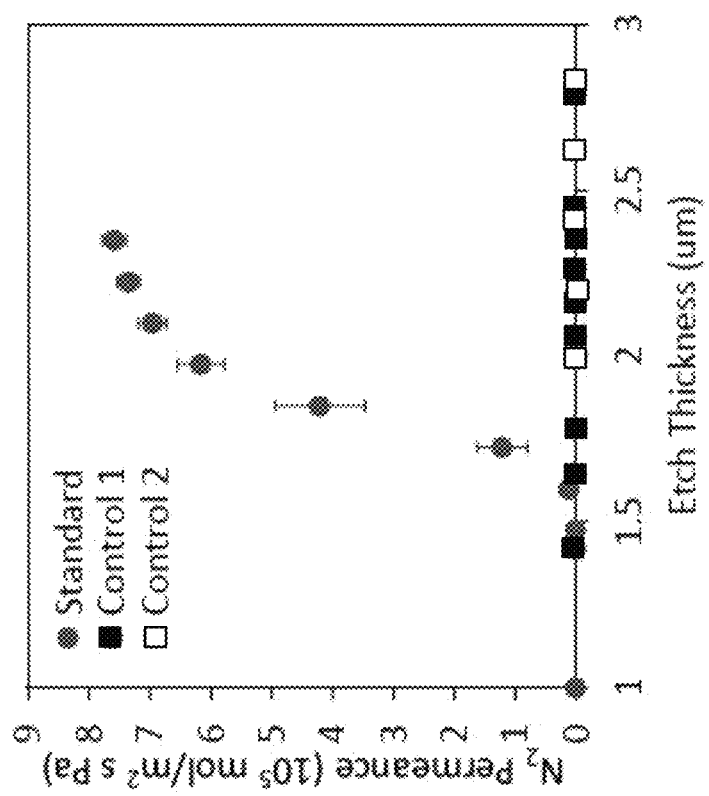
Figure 16A:
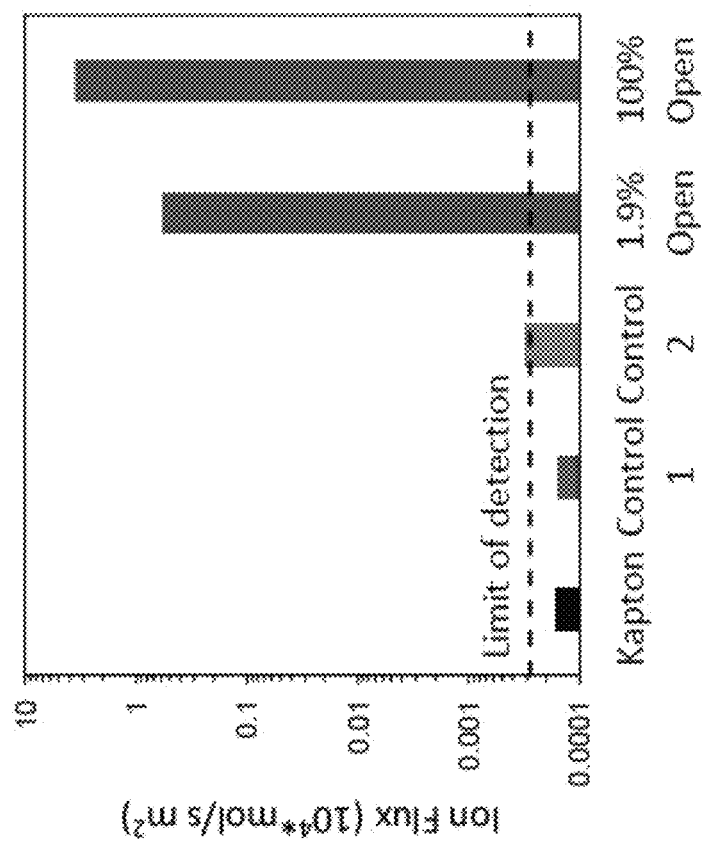

FIG. 16B is a chart of concentration-driven ion flux comparing control membranes with a nanoporous membrane with partially open CNTs (1.9% Open) and a nanoporous membrane with 100% open CNTs. No ion flux was detected through the control membranes. The ion flux through etched controls (Control 1 and Control 2) were comparable to a solid piece of Kapton.

Diffusion of Ions at Across Standard and Control Membranes

Figure 17:
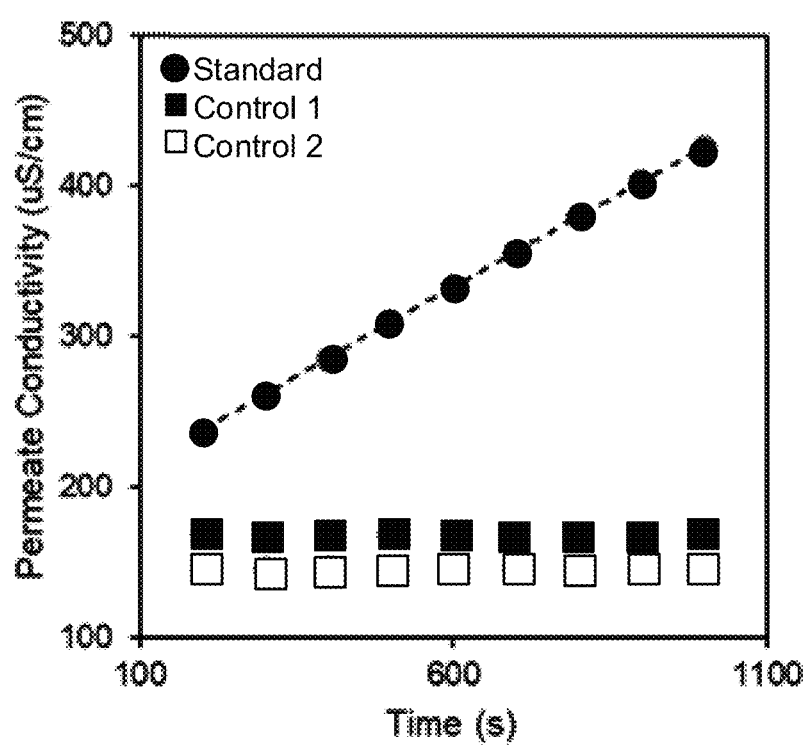

FIG. 17 is a chart of permeate conductivity versus time under a 50 mM KCl concentration gradient at pH 3. The permeate conductivity of the standard nanoporous membrane (●) demonstrated a linear increase relative to time. No conductivity change was detected in the permeate when using the control membranes Control 1 (■) and Control 2 (□).

In Use

In use, incorporation of CNTs in flexible polymeric matrices as selective, moisture-conductive pores may be used in protective fabrics for applications in both civilian (for example, first response and clean-up missions, hospitals, etc.) and military settings (for example, protection from chemical warfare agents).

Ultrabreathable and protective nanoporous membranes described herein may also be useful in separation processes, such as membrane distillation, pervaporation, water purification and desalination.

Uses of the embodiments described herein may include applications that involve size and/or electrostatic based separations of ions and small molecules under a concentration driving force in liquid environments, e.g., hemodialysis, drug delivery, measuring diffusion rates, photocatalysis, immunoisolation, separation/recovery of alkali/acid waste solutions, algae cultivation, real time biosensing, and peptide/protein/bioconjugate purification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
    a nanoporous membrane, comprising:
        a plurality of carbon nanotubes; and
        a fill material in interstitial spaces between the carbon nanotubes for limiting or preventing fluidic transfer between opposite sides of the nanoporous membrane except through interiors of the carbon nanotubes,
        wherein longitudinal axes of the carbon nanotubes are substantially parallel,
        wherein an average inner diameter of the carbon nanotubes is about 20 nanometers or less,
        wherein both ends of at least some of the carbon nanotubes are open,
        wherein the fill material is impermeable or having an average porosity that is less than the average inner diameter of the carbon nanotubes
        wherein the nanoporous membrane is characterized by exhibiting a rate of diffusion of a component of a feed fluid through the nanoporous membrane, under a concentration gradient in the absence of a pressure gradient and a voltage gradient, that is greater than one times a bulk diffusivity of the component, wherein the component is selected from the group consisting of: ions having an average diameter smaller than an average inner diameter of the carbon nanotubes, and molecules having average diameter smaller than the average inner diameter of the carbon nanotubes.

2. The product as recited in claim 1, wherein less than 95% the carbon nanotubes have both ends open.

3. The product as recited in claim 1, wherein the average inner diameter of the carbon nanotubes is about 10 nanometers or less.

4. The product as recited in claim 1, wherein the fill material is impermeable.

5. The product as recited in claim 1, wherein the rate of diffusion of the component through the nanoporous membrane is at least one order of magnitude greater than the bulk diffusivity of the component.

6. A product, comprising:
    a first chamber configured to receive a feed fluid;
    a second chamber configured to receive a permeate fluid; and
    a nanoporous membrane between the first and second chambers for transporting a component from the feed fluid under a concentration gradient,
    wherein the nanoporous membrane comprises:
        a plurality of carbon nanotubes having substantially parallel longitudinal axes; and
        a fill material in interstitial spaces between the carbon nanotubes for preventing fluidic transfer between opposite sides of the nanoporous membrane except through interiors of the carbon nanotubes,
    wherein an average inner diameter of the carbon nanotubes is about 10 nanometers or less,
    wherein both ends of at least some of the carbon nanotubes are open,
    wherein the fill material is impermeable to the component and fluids,
    wherein the component is selected from the group consisting of: ions having an average diameter smaller than an average inner diameter of the carbon nanotubes, and molecules having an average diameter smaller than the average inner diameter of the carbon nanotubes,
    with a proviso that the product is configured to not apply a pressure gradient across the nanoporous membrane.

7. The product as recited in claim 6, wherein the average inner diameter of the carbon nanotubes is about 6 nanometers or less.

8. The product as recited in claim 6, wherein less than 95% the carbon nanotubes have both ends open.

9. The product as recited in claim 6, wherein the feed fluid is blood.

10. The product as recited in claim 6, wherein the product is configured to perform kidney dialysis.

11. The product as recited in claim 6, with a proviso that the product is configured to not apply a voltage gradient across the nanoporous membrane.

12. The product as recited in claim 6, wherein the nanoporous membrane is characterized by exhibiting a rate of diffusion of the component from the feed fluid through the nanoporous membrane, under a concentration gradient in the absence of a pressure gradient and a voltage gradient, that is greater than one times a bulk diffusivity of the component in the feed fluid, wherein the component is selected from the group consisting of: ions having an average diameter smaller than an average inner diameter of the carbon nanotubes, and molecules having an average diameter smaller than the average inner diameter of the carbon nanotubes.

13. The product as recited in claim 6, wherein a rate of diffusion of the component through the nanoporous membrane is maintainable at or above at least one order of magnitude greater than a bulk diffusivity of the component in the feed fluid.

14. A method, comprising:
adding a feed fluid to a first chamber; and
adding a permeate fluid to a second chamber,
wherein the first and second chambers are separated by a nanoporous membrane configured for transporting a component from the feed fluid to the permeate fluid under a concentration gradient,
wherein the nanoporous membrane comprises:
- a plurality of carbon nanotubes having substantially parallel longitudinal axes; and
- a fill material in interstitial spaces between the carbon nanotubes for preventing fluidic transfer between opposite sides of the nanoporous membrane except through interiors of the carbon nanotubes, wherein an average inner diameter of the carbon nanotubes is about 10 nanometers or less,
wherein both ends of at least some of the carbon nanotubes are open,
wherein the fill material is impermeable,
wherein the component is selected from the group consisting of: ions having an average diameter smaller than an average inner diameter of the carbon nanotubes, and molecules having an average diameter smaller than the average inner diameter of the carbon nanotubes,
wherein no pressure gradient is applied across the nanoporous membrane.

15. The method as recited in claim 14, wherein less than 95% the carbon nanotubes have both ends open.

16. The method as recited in claim 14, wherein the feed fluid is blood.

17. The method as recited in claim 14, wherein the method is kidney dialysis.

18. The method as recited in claim 14, wherein no voltage gradient is applied across the nanoporous membrane.

19. The method as recited in claim 14, wherein a rate of diffusion of the component from the feed fluid through the nanoporous membrane, under a concentration gradient in the absence of a pressure gradient and a voltage gradient, that is greater than one times a bulk diffusivity of the component in the feed fluid.

20. The product as recited in claim 1, the nanoporous membrane is configured for diffusion of more than one component selected from the group consisting of: an ion and a molecule.

* * * * *